(12) United States Patent
Bhaskar et al.

(10) Patent No.: US 12,443,874 B2
(45) Date of Patent: Oct. 14, 2025

(54) QUANTUM ENTANGLEMENT DISTRIBUTION SERVICE

(71) Applicant: IONQ INC., College Park, MD (US)

(72) Inventors: Mihir Keshav Bhaskar, Cambridge, MA (US); Bartholomeus Johannes Machielse, Somerville, MA (US); David Sarkis Levonian, Cambridge, MA (US); Antia Lamas Linares, Austin, TX (US); Oskar Jon Painter, Sierra Madre, CA (US)

(73) Assignee: IONQ INC., College Park, MD (US)

( * ) Notice: Subject to any disclaimer, the term of this patent is extended or adjusted under 35 U.S.C. 154(b) by 968 days.

(21) Appl. No.: 17/548,418

(22) Filed: Dec. 10, 2021

(65) Prior Publication Data

US 2023/0188548 A1    Jun. 15, 2023

(51) Int. Cl.
| | |
|---|---|
| *G06N 10/80* | (2022.01) |
| *G06N 10/60* | (2022.01) |
| *H04L 9/08* | (2006.01) |

(52) U.S. Cl.
CPC ............ *G06N 10/80* (2022.01); *G06N 10/60* (2022.01); *H04L 9/0855* (2013.01)

(58) Field of Classification Search
CPC ........ G06N 10/00; G06N 10/20; G06N 10/40; G06N 10/60; G06N 10/70; G06N 10/80;
(Continued)

(56) References Cited

U.S. PATENT DOCUMENTS

| | | |
|---|---|---|
| 7,457,416 B1 | 11/2008 | Elliott |
| 7,460,670 B1 | 12/2008 | Elliott |
| (Continued) | | |

FOREIGN PATENT DOCUMENTS

| | | | |
|---|---|---|---|
| CA | 3143227 A1 * | 12/2020 | ............. G06N 10/20 |
| CA | 3174231 A1 * | 10/2021 | ........... G06F 11/1004 |
| (Continued) | | | |

OTHER PUBLICATIONS

U.S. Appl. No. 17/548,422, filed Dec. 10, 2021, Antia Lamas Linares, et al.
(Continued)

*Primary Examiner* — Steven P Sax
(74) *Attorney, Agent, or Firm* — Dickinson Wright PLLC

(57) ABSTRACT

A system and method for providing quantum entanglement as a service are described. Intermediate nodes which may be located in trusted or trustless locations are used to distribute quantum entanglement to endpoints, such as endpoints of customers of a quantum entanglement distribution service. The distributed quantum entanglement provides a secure communication path that does not rely on trust placed in an infrastructure or software provider. To distribute the quantum entanglement, intermediate nodes comprising quantum memories are used. Joint measurements are performed on quantum particles of respective entangled quantum pairs received at the intermediate nodes without collapsing superposition states of the particles. This allows for the quantum entanglement to be extended across intermediate nodes while maintaining entanglement and superposition of the entangled quantum particles.

19 Claims, 23 Drawing Sheets

(58) Field of Classification Search
CPC ..... H04L 9/0855; H04L 9/0819; H04B 10/70;
H04B 10/25; G02B 23/04; G02B 6/1225;
G06F 7/588; G21K 1/00
See application file for complete search history.

(56) References Cited

U.S. PATENT DOCUMENTS

| | | | |
|---|---|---|---|
| 7,512,242 B2 | 3/2009 | Parson | |
| 7,646,873 B2 | 1/2010 | Lee | |
| 8,781,334 B2 | 7/2014 | Munro | |
| 9,111,229 B2 * | 8/2015 | Harrison | G06N 10/60 |
| 9,680,452 B1 * | 6/2017 | Abdo | H04B 10/70 |
| 9,692,595 B2 | 6/2017 | Lowans | |
| 9,858,531 B1 | 1/2018 | Monroe | |
| 10,971,672 B2 | 4/2021 | Olivadese | |
| 11,200,508 B2 | 12/2021 | Reagor | |
| 11,288,587 B2 | 3/2022 | Paik | |
| 11,551,129 B2 * | 1/2023 | Limberg | G06N 20/20 |
| 11,588,613 B1 * | 2/2023 | Garrett | H04B 10/70 |
| 11,641,242 B1 | 5/2023 | Bhaskar | |
| 11,962,354 B2 | 4/2024 | Bhaskar et al. | |
| 12,014,246 B2 * | 6/2024 | Bhaskar | G02B 6/1225 |
| 2004/0184603 A1 | 9/2004 | Parson | |
| 2006/0062392 A1 | 3/2006 | Lee et al. | |
| 2007/0130455 A1 | 6/2007 | Elliott | |
| 2012/0177201 A1 | 7/2012 | Ayling | |
| 2013/0251145 A1 | 9/2013 | Lowans | |
| 2015/0055961 A1 * | 2/2015 | Meyers | H04B 10/70 398/140 |
| 2019/0349094 A1 * | 11/2019 | Santra | G02B 23/04 |
| 2020/0328886 A1 * | 10/2020 | Newton | H04L 9/0819 |
| 2020/0382219 A1 * | 12/2020 | Innes | H04W 12/04 |
| 2020/0396067 A1 | 12/2020 | Barker | |
| 2021/0105135 A1 * | 4/2021 | Figueroa | H04B 10/70 |
| 2021/0175976 A1 * | 6/2021 | Rahman | H04L 9/0855 |
| 2021/0176055 A1 | 6/2021 | Rahman | |
| 2021/0334692 A1 * | 10/2021 | Röhsner | G06N 10/00 |
| 2021/0342729 A1 | 11/2021 | Scheer | |
| 2022/0026195 A1 | 1/2022 | Fertig | |
| 2022/0269976 A1 * | 8/2022 | Wang | H04L 9/0855 |
| 2023/0020193 A1 | 1/2023 | Williams | |
| 2023/0188335 A1 | 6/2023 | Linares et al. | |
| 2023/0327780 A1 | 10/2023 | Bhaskar et al. | |

FOREIGN PATENT DOCUMENTS

| | | | | |
|---|---|---|---|---|
| CA | 3200338 A1 | * | 7/2022 | G06N 10/00 |
| CN | 101401116 A | * | 4/2009 | B82Y 10/00 |
| CN | 110574310 A | * | 12/2019 | H04B 10/25 |
| CN | 112332984 A | | 2/2021 | |
| CN | 113472451 A | * | 10/2021 | |
| NL | 2026015 B1 | * | 3/2022 | |
| NL | 2029849 B1 | * | 6/2023 | G06N 10/40 |
| WO | WO-2019132679 A1 | * | 7/2019 | G06F 7/588 |
| WO | WO 2021016095 A | * | 1/2021 | |
| WO | WO-2021245529 A1 | * | 12/2021 | G21K 1/00 |
| WO | WO-2023054747 A1 | * | 4/2023 | H04B 10/70 |

OTHER PUBLICATIONS

U.S. Appl. No. 17/548,216, filed Dec. 10, 2021, Desmond O'Neil Davis, et al.
International Search Report and Written Opinion mailed Apr. 17, 2023 in PCT/US2022/080930, Amazon Technologies, Inc., pp. 1-13.
Li Zhonghui et al.: "Building a large-scale and wide-area quantum Internet based on an OSI-alike model", China Communications, China Institute of Communications, Nov. 2, 2021, pp. 1-14, vol. 18, No. 10, Piscataway, NJ, USA.
K. Boone, et al., "Entanglement over global distances via quantum repeaters with satellite links," arXiv preprint: arXiv:1410.5384v1 [quant-ph] 2014, pp. 1-8.
Jasminder S. Sidhu, et al., "Advances in Space Quantum Communications," IET Research Journals, © The Institution of Engineering and Technology 2015, pp. 1-26.
Sheng-Kai Liao, et al. "Satellite-relayed intercontinental quantum network," Physical Review Letters 120, 030501 (2018), pp. 1-4.
Mustafa Gundoğan, et al., "Proposal for space-borne quantum memories for global quantum networking," www.nature.com/npjqi, npj Quantum Information vol. 7, Article No. 128 (2021), pp. 1-10.
M. K. Bhaskar, et al., " Experimental demonstration of memory-enhanced quantum communication," Nature | vol. 580 | 2020, pp. 60-76.
Boone et al, "Entanglement over global distances via quantum repeaters with satellite links", Physical Review A 91 (2015), arXiv:1410. 5384 [quant-ph], pp. 1-8.
Sidhu et al, "Advances in Space Quantum Communications", IET Research Journals, arXiv:2103.12749 (2021), pp. 1-26.
Gundogan et al, "Proposal for space-borne quantum memories for global quantum networking," NPJ Quantum Information 7:128 (2021), pp. 1-10.
Pirandola, "Satellite quantum communications: Fundamental bounds and practical security", Physical Review Research 3, 023130 (2021), Published by the American Physical Society, pp. 1-29.
Harney and Pirandola, "Optimal Performance of Global Quantum Networks", arXiv:2104.10701 (2021), pp. 1-14.
Liao et al, "Satellite-Relayed Intercontinental Quantum Network," Physical Review Letters 120, 030501 (2018), arXiv:1801.04418 [quant-ph], pp. 1-10.
Gundogan et al, "Space-borne quantum memories for global quantum communication," arxiv.org, Jun. 18, 2020, pp. 1-11, Cornell University Library, Ithaca, NY.
Sumeet Khatri, et al., "Spooky action at a global distance: analysis of space-based entanglement distribution for the quantum internet," arxiv.org, Jan. 11, 2021, pp. 1-22, Cornell University Library, Ithaca, NY.
U.S. Appl. No. 18/605,642, filed Mar. 14, 2024, Mihir Keshav Bhaskar, et al.
U.S. Appl. No. 18/309,247, filed Apr. 28, 2023, Mihir Keshav Bhaskar, et al.
U.S. Appl. No. 18/478,794, filed Sep. 29, 2023, Mihir Keshav Bhaskar, et al.
U.S. Appl. No. 18/478,809, filed Sep. 29, 2023, Mihir Keshav Bhaskar, et al.

* cited by examiner

QUANTUM ENTANGLEMENT DISTRIBUTION SERVICE

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

Figure 1:
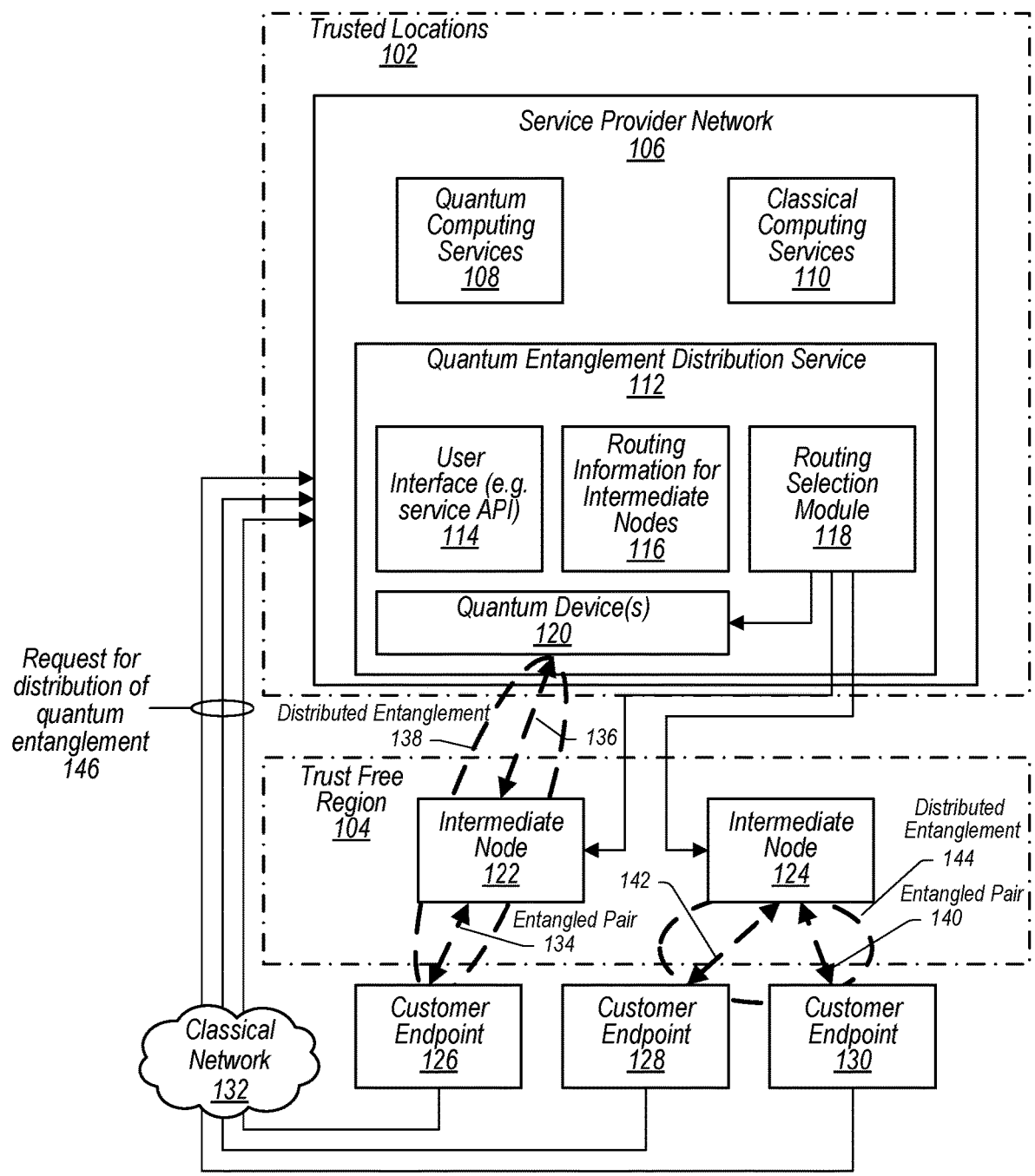
FIG. 1 illustrates a quantum entanglement distribution service included in a service provider network, wherein the quantum entanglement distribution service is configured to distribute quantum entanglement to customer endpoints via intermediate nodes in locations outside of trusted locations of the service provider network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for providing distributed quantum entanglement as a service to customer endpoints. In some embodiments, a quantum entanglement distribution service includes intermediate nodes located at trusted and/or non-trusted locations, where trust is based on whether or not the intermediate nodes are located within facilities controlled by a service provider or are located at facilities outside of the control of the service provider. Also, in some embodiments, a quantum entanglement distribution service provides a secure and private mechanism for a customer to provide quantum gates to be executed in a generic quantum circuit at a quantum computing service. The quantum entanglement service also provides a secure and private mechanism to receive results of execution of the quantum circuit including the securely provided quantum gates wherein the customer does not need to rely on a service provider network hosting the quantum computing service to provide the security and/or privacy. For example, as described in more detail below, a quantum entanglement distribution service may allow a quantum computing service to provide customers with blind quantum computing. In some embodiments, the quantum entanglement distribution service also comprises computing devices configured to receive a request for distributed quantum entanglement between sets of endpoints, determine a path of network links and intermediate nodes that connect the set of endpoints, and cause sets of entangled quantum particle pairs to be distributed between intermediate nodes, via the determined network links, along the determined path to provide distributed quantum entanglement between the set of endpoints. Distributed quantum entanglement provides a quantum secure connection between the set of endpoints that is protected against interference or eavesdropping along the path, either at trusted or non-trusted locations. For example, in contrast to classical communications that may be intercepted or altered in a communication path, distributed quantum entanglement provides an end-to-end entangled quantum connection that can be monitored at the endpoints to ensure the communication path is not being monitored or altered.

For example, quantum particles may be in a state called superposition, wherein the quantum particles inhabit two states at the same time with different probabilities associated with each state (e.g., 0 and 1, with different probabilities associated with 0 and associated with 1). However, attempts to measure the quantum particles will cause the quantum particles to collapse from the superposition state into one or the other of the states (e.g., 0 or 1). Additionally, sets of quantum particles can be entangled such that the quantum states of the quantum particles are inextricably linked even if separated by large distances. For example, physical properties of entangled quantum particles such as position, momentum, spin, and/or polarization may be perfectly correlated across large distances when entangled. In some cases, such properties may have a correlation such as same or opposite, meaning that if a first quantum particle of an entangled pair of quantum particles has a first spin direction, it's entangled quantum particle partner may have a spin direction that is the same or opposite of the direction of the spin of the first quantum particle of the entangled pair of quantum particles. In some embodiments, a basis of measurement may also be communicated via classical communication channels, such as a basis of measurement indicating an axis on which spin is pointing. Thus, by measuring a spin direction of the first quantum particle of the entangled pair of quantum particles, one can automatically determine the spin direction of the partner quantum particle of the entangled pair of quantum particles (e.g., same or different). Any attempt to interfere with the entangled quantum particles by a third party at locations between the endpoints holding the first and second entangled particles of the entangled pair will interrupt the entanglement, wherein such interruption is detectable at the endpoints. Thus, a first customer holding an entangled particle of an entangled pair of quantum particles at a first endpoint and a second customer holding a partner entangled particle of the entangled pair of quantum particles at as second endpoint can be assured that no other party is monitoring or altering communications between the first and second endpoints by observing the entanglement and superposition states of the entangled quantum particles held at either endpoint.

While entanglement distributed between two endpoints via a single pair of entangled quantum particles may provide the benefits described above, other limitations may prevent or inhibit the use of quantum entanglement in such a way wherein communicating entities are directly connected using a single set of entangled quantum particles. For example, infrastructure costs may be inhibitive to provide direct connections using a single set of entangled photons between all parties that may wish to communicate using quantum entanglement. Also, losses along a communication link, such as optical losses along a fiber optic communication link, may limit distances that entanglement may be distributed when distributing quantum particles of a single pair of entangled quantum particles between communicating entities. One approach to dealing with such limitations involves linking together such sets of endpoints by performing quantum measurements at connecting node holding one end of a pair of entangled quantum particles and then using the measured information to relay the information being transmitted using another set of entangled quantum particles. In such an approach, quantum entanglement provides assurances that there is no eavesdropping or interference between the connecting nodes. However, the quantum entanglement is lost at the connecting nodes when the quantum measurements are taken. Thus, in such an approach, eavesdropping or interference is possible at the connecting nodes. For example, a third party could intercept or alter the information being transmitted after quantum measurements are performed at a connecting node and before the information is then relayed using a subsequent set of entangled quantum particles.

In order to overcome such short comings, in some embodiments, a quantum entanglement distribution service, distributes quantum entanglement between endpoints connected via intermediate nodes without breaking the quantum entanglement at any of the intermediate nodes. For example, instead of performing quantum measurements at an intermediate node that disrupt entanglement and/or collapse superposition, a quantum particle of a first set of quantum particles received at the intermediate node via a first network link may be stored in a quantum memory of the intermediate node. Also, a second quantum particle of a second set of quantum particles received at the intermediate node via a second network link may also be stored in the quantum memory of the intermediate node. Additionally, the intermediate node may be configured to perform joint measurements of the first and second quantum particles of the respective entangled pairs received at the intermediate node and stored in the quantum memory of the intermediate node, wherein the joint measurements do not provide any information about the quantum state of the respective quantum particles individually but instead provides information about the correspondence relationship between the two quantum particles. For example, the measurements may indicate that they have a correlation that is the same or opposite. Note, using spin as an example, such measurements do not tell the spin direction of either quantum particle, just the relationship between the two (e.g., they have the same or opposite spin directions).

In some embodiments, a quantum entanglement distribution service may include multiple such intermediate nodes with quantum memories and joint measurement capabilities. The quantum entanglement distribution service may further determine an overall entanglement relationship between quantum particles held at endpoints of distributed quantum entanglement based on joint measurements performed at one or more respective intermediate nodes. For example, if an odd number of intermediate nodes generate joint measurements indicating an opposite relationship, then the quantum entanglement distribution service may indicate to the two endpoints of the distributed entanglement that the quantum particles held at the two endpoints have an "opposite" entanglement relationship. In contrast, if the joint measurements at the intermediate nodes yield an even number of "opposite" joint measurement relationships or only "same" joint measurement relationships, then the quantum entanglement distribution service may indicate to the two endpoints of the distributed entanglement that the quantum particles held at the two endpoints have a "same" entanglement relationship. Thus, the two endpoints, can use the received quantum entanglement relationship information to determine how a measurement taken at the respective endpoint correlates to a measurement taken at the other endpoint of the distributed quantum entanglement e.g., it will be the same or opposite. Note that in such a circumstance, there is no way to determine what the quantum measurement will be based on this quantum entanglement relationship information alone, only that a quantum measurement at the other end of the distributed quantum entanglement will be the same or opposite as a measurement at an opposite end of the distributed quantum entanglement.

In some embodiments, the ability to communicate free from third-party interception or altering via distributed quantum entanglement may be used in a variety of manners. For example, a symmetric encryption key may be distributed between parties using distributed entanglement, wherein quantum measurements are taken at either end of the distributed entanglement to determine bits of the symmetric encryption key. In some embodiments, a basis of measurement may be communicated between the endpoints as well as joint measurements such as "same" or "opposite." For example, such joint measurements and/or measurement basis may be communicated via a classical communications channel. The basis of measurement may, for example, indicate an axis on which spin is pointing. However, regardless of the basis of measurement "same" or "different" can be applied to this class of entangled states, which makes measurements performed at the respective endpoints unique and is a part of the symmetric encryption key generation protocol.

In some embodiments, classical or quantum data may be communicated using distributed quantum entanglement via quantum teleportation between endpoints sharing distributed entanglement. For example, in quantum teleportation, a first party holding a quantum particle of the distributed entanglement may combine the particle of the distributed entanglement with a qubit storing quantum information that is to be teleported using a two-qubit entangling quantum logic gate. The first party may then measure a change in the particle of the distributed entanglement when combined with the qubit to be teleported. This change may be communicated to the second party holding the other end of the distributed entanglement. In some embodiments, a basis of measurement may be communicated between the endpoints, for example via a classical communications channel. The basis of measurement may, for example, indicate an axis on which spin is pointing. Note, the measurement does not indicate the actual quantum information that is being communicated, just how the entangled particle of the distributed entanglement changed when combined with the qubit storing the quantum information to be teleported. The other party holding the other particle of the distributed quantum entanglement at the other end of the distributed entanglement can then re-create the quantum information being teleported by observing how the particle of the distributed entanglement changed and knowing the measurement information communicated form the first party sending the quantum information via quantum teleportation.

Thus, in some embodiments, distributed entanglement may be used to distribute data such as bits of an encryption key, data such as quantum information to be used by a quantum computer, or data such as may be used by a classical computer. The data may be transmitted via a quantum secure connection that can be positively verified to be secure such that there is a guarantee that no other party is eavesdropping or altering the data being transmitted. Thus, customers of a quantum entanglement distribution service can directly and easily verify that their data is never exposed through the communications pipeline, independent of any third-party hardware or service provider. Such communications may be referred to as "trust-less" communications because the communicating parties do not need to rely on trust in a service or infrastructure provider to provide security of the communications infrastructure. In some embodiments, an entanglement distribution service may include intermediate nodes at varied geographic locations that enable entanglement distribution across continents (e.g., the continental United States). Also, in some embodiments, an entanglement distribution service may include satellite based intermediate nodes that enable entanglement distribution across continents and/or between continents (e.g., via satellite network links).

In some embodiments, customers of a quantum entanglement distribution service may possess or may receive from the distributed entanglement service a photon detector that connects to a fiber optic channel. Such a photon detector may enable a customer to communicate via distributed entanglement. In some embodiments, a customer may not need to acquire or possess a quantum computer, but may instead couple a classical computer to a photon detector in order to communicate using distributed entanglement.

In some embodiments, quantum memories included in intermediate nodes may be implemented using various quantum memory technologies, such as silicon-vacancy in diamond (SiV), nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc.

In some embodiments, a quantum entanglement distribution service may include various types of endpoints or nodes such as:

A customer node, which may be as simple as a photon detector coupled with a fiber optic modem and/or a laser coupled with a fiber optic modem. In some embodiments, a customer node may be more complex, such as including a quantum sensor or quantum computer. In some embodiments, ancilla qubits of a quantum circuit may be connected via distributed entanglement to ancilla qubits of a remote quantum circuit, such as at a quantum computing service or a quantum hardware provider.

A quantum repeater, which may be located in an isolated location in a trust-free location. For example, a quantum repeater node may be installed at locations along existing fiber optic cable networks, wherein fiber optic links of the existing fiber optic cable networks are used to distributed entangled photons via the installed repeater nodes of the quantum entanglement distribution service.

An entangled particle source node that is located between repeater nodes and/or between a repeater node and a customer node (or service provider node). The entangled particle source node may generate pairs of entangled particles, wherein one of the entangled particles of the pair is sent from the entangled particle source node to a first node connected to the entangled particle source node via a first network link and a second one of the entangled particles of the pair is sent from the entangled particle source node to a second node connected to the entangled particle source node via a second network link. Thus, instead of requiring entangled particles to travel a full distance between repeater nodes, instead entangled particles may travel approximately half a distance between repeater nodes. For example, an entangled particle source node may be located at a mid-point in a network link between repeater nodes and may provide respective halves of a pair of entangled particles to the respective repeater nodes between which the entangled particle source node is located. Note that an entangled particle source node included in a network link provides an advantage of service as a source of entanglement that would otherwise have to be generated in some other way, for example by alternatively using a quantum memory directly to emit photons, which may be more challenging and may result in lower bandwidths.

An entangled particle source node that is co-located at a customer endpoint, wherein the entangled particle source node is configured to generate an entangled set of particles, wherein one of the entangled pair is held at the customer endpoint and the other entangled particle of the pair is transmitted via a communications link such as a fiber link or an optical ground station/free-space channel that connects the customer endpoint to an intermediate node controlled by the quantum entanglement distribution service.

A data center node or service provider node may also include a repeater node, but may be located within a trust boundary of a service provider network. Thus, such a node may interface with classical computing resources of the data center and/or extend entanglement to quantum computing resources of the data center or of a quantum hardware provider associated with the service provider network. This may allow a customer of a service provider network to securely access classical and/or quantum computing resources of the service provider network allocated to the customer via a quantum secure connection enabled using distributed quantum entanglement.

Figure 14:
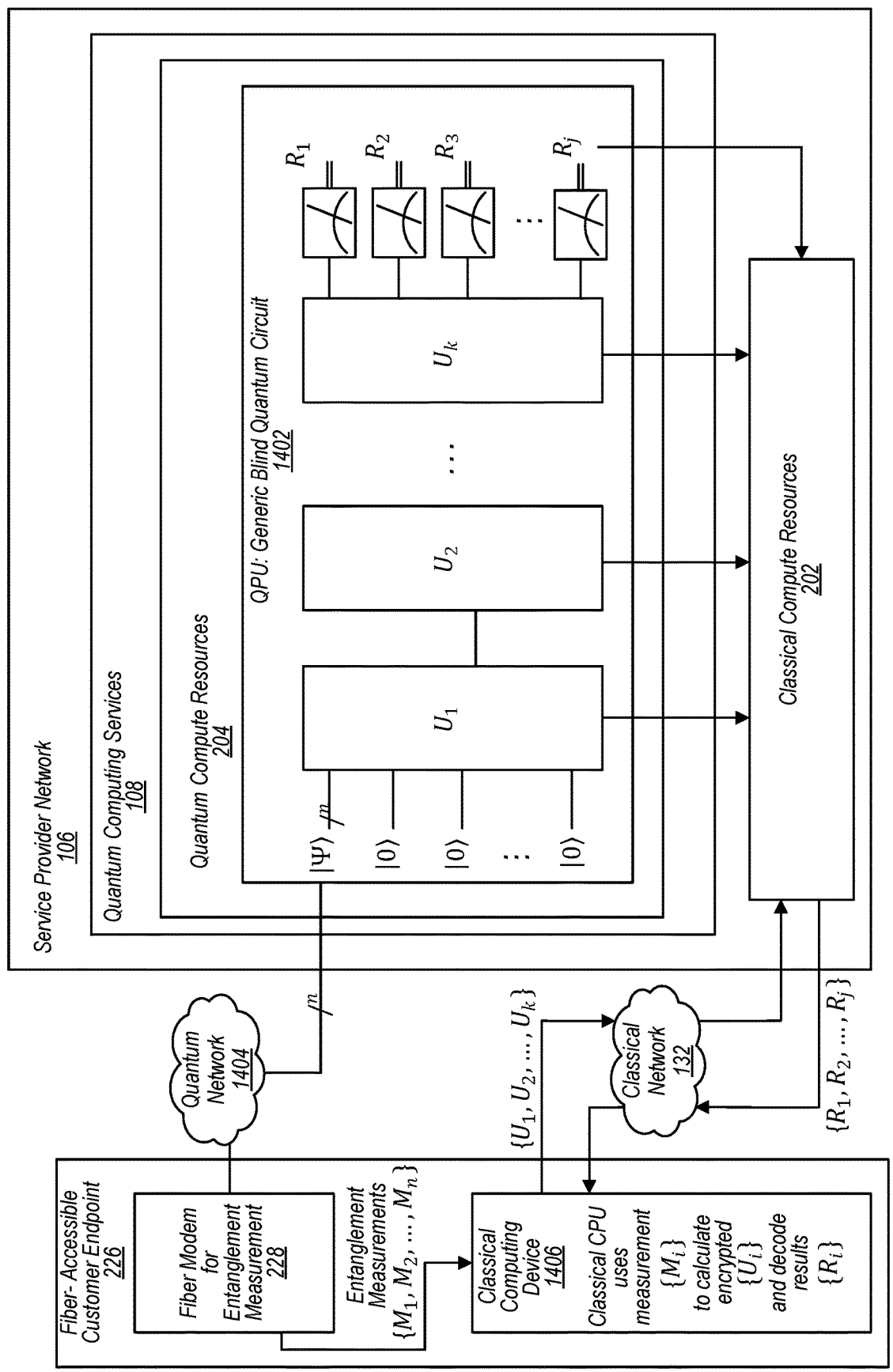
FIG. 14 illustrates a quantum computing service of a provider network providing blind quantum computing services to a customer, wherein the customer communicates quantum gates to be included in a generic quantum circuit using a distributed quantum entanglement in a way that hides the configuration of the quantum circuit from the service provider, according to some embodiments.

A quantum computer node that provides blind quantum computing capability for a customer to securely and privately submit quantum gates to be included in a generic quantum circuit and to receive results of execution of the quantum circuit including the submitted gates, wherein the results are returned to the customer in a secure and private manner. For example, a blind quantum computing arrangement is illustrated in FIG. 14.

FIG. 1 illustrates a quantum entanglement distribution service included in a service provider network, wherein the quantum entanglement distribution service is configured to distribute quantum entanglement to customer endpoints via intermediate nodes in locations outside of trusted locations of the service provider network, according to some embodiments.

In some embodiments, a service provider network, such as service provider network 106, includes a quantum entanglement service 112. Physical infrastructure of the service provider network is located at trusted locations 102, such as data center sites of the service provider network. In some embodiments, intermediate nodes of a quantum entanglement distribution service, such as quantum entanglement distribution service 112, may also be located at trusted locations, such as trusted locations 102, that include data center sites of the service provider network and/or intermediate nodes of the quantum entanglement distribution service that are located at locations controlled by the service provider network. Additionally, the quantum entanglement distribution service 112 may include other intermediate nodes located at locations outside of trust guarantees provided by the service provider network 106. For example, intermediate nodes 122 and 124 are located in a region (104) comprising locations outside of trust guarantees of the service provider network. For example, these locations may be co-location facilities outside of the control of the service provider network, or may be locations along a fiber optic network link, such as equipment rooms or equipment boxes, that are not located at locations with security guaranteed by the service provider network.

In some embodiments, a quantum entanglement distribution service, such as quantum entanglement distribution service 112, includes a user interface 114, a routing information store 116, and a routing selection module 118. In some embodiments, customers associated with any of customer endpoints 126, 128, 130, etc. may submit a request 146 for distribution of quantum entanglement, wherein the request 146 is sent via classical network 132 (e.g., such as an internet network or direct connect network connection implemented using classical computing hardware). The request may be received at user interface 114 of quantum entanglement distribution service 112, which in some embodiments may be implemented as an application programmatic interface (API), console interface, or interface of a quantum service design kit (e.g., quantum SDK), for example as shown in more detail in FIG. 13, as a few examples. The request 146 may specify a set of endpoints between which quantum entanglement is to be distributed, or may indicate a customer endpoint to which quantum entanglement is to be distributed to connect the customer endpoint to resources of the service provider network, such as quantum computing resources 108 and/or classical computing resources 110 of service provider network 106.

Figure 3:
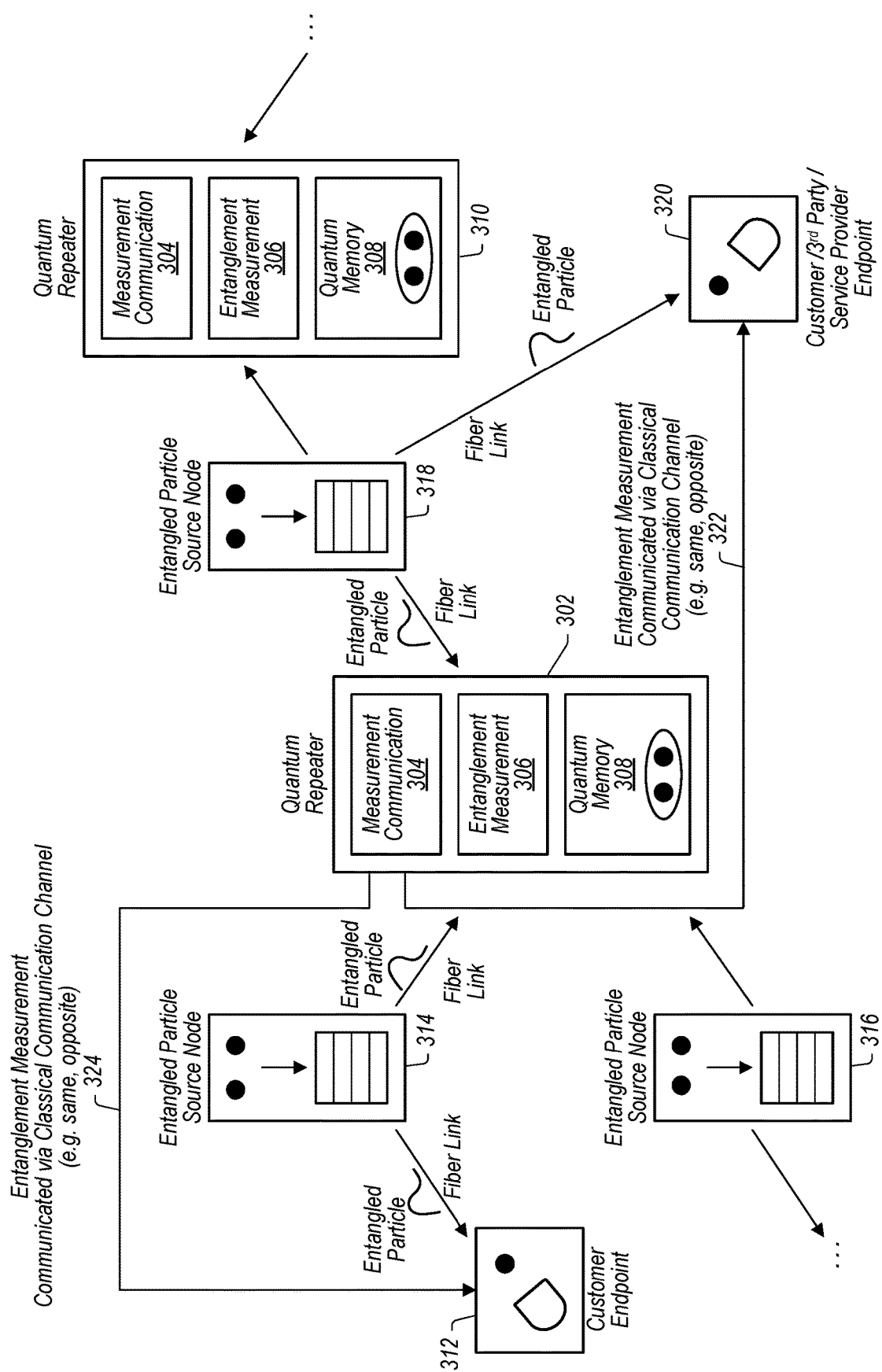
FIG. 3 illustrates intermediate nodes used in entanglement distribution, wherein the intermediate nodes distribute entangled particle pairs (e.g., pairs of optical photons) via network links to distribute entanglement between a set of endpoints for which entanglement distribution has been requested, according to some embodiments.

In some embodiments, the intermediate nodes 122 and/or 124 may be quantum repeater nodes, as shown in FIG. 3. In some embodiments, additional intermediate nodes may include entangled particle source nodes as shown in FIG. 3.

In some embodiments, routing information store 116 may store routing information for intermediate nodes and routing selection module 118 may use the stored routing information to select a set of intermediate nodes and intervening network links that forms a path between the endpoints specified in request 146 and/or a customer endpoint specified in request 146 and a data center site hosting quantum computing resources or classical computing resources to be accessed via the requested distributed entanglement.

As an example, a customer associated with customer endpoint 126 may submit a request 146 to user interface 114, wherein the request is for quantum entanglement to be distributed between the customer endpoint 126 and classical computing resources of classical computing services 110 or quantum computing resources of quantum computing services 108 allocated to the customer in service provider network 106. In response to receiving the request, routing selection module 118 may use routing information stored in routing information store 116 to determine that intermediate node 122 may be used to distribute quantum entanglement between quantum computing device 120 located at a service provider network location associated with the classical or quantum computing resources allocated to the customer and the specified customer endpoint 126. The routing selection module 118 may then instruct intermediate node 122 to perform joint measurements on a set of particles stored in a quantum memory of intermediate node 122, wherein the set of particles comprises a particle of a first set of entangled quantum particles (where the intermediate node 122 holds one particle of the pair and the quantum device 120 holds the other particle of the first entangled pair) and a particle of a second set of entangled particles (where the intermediate node 122 holds one particle of the second entangled pair and the customer endpoint 126 holds the other particle of the second entangled pair). The joint measurements performed at intermediate node 122 may determine a correlation relationship between the first and second sets of entangled particles such that the entanglement is effectively extended from quantum device 120 to customer endpoint 126 via intermediate node 122. For example, distributed entanglement 138 may extend from quantum device 120 to customer endpoint 126 by linking entangled pairs 134 and 136 via joint measurements performed at intermediate node 122. Additional details regarding how joint measurements effectively extend entanglement distribution are discussed in FIGS. 3-5 and 12.

As another example, a customer associated with one or both of customer endpoints 128 and 130 may send a request 146 to user interface 114 of quantum entanglement distribution service 112 requesting quantum entanglement be distributed between customer endpoints 128 and 130. In response to receiving such a request 146, routing selection module 118 may use routing information stored in routing information store 116 to determine that intermediate node 124 may be used to distribute quantum entanglement between customer endpoints 128 and 130. The routing selection module 118 and/or another component of quantum entanglement distribution service 112 may send instructions to intermediate node 124 to cause quantum entanglement to be distributed between customer endpoints 128 and 130. For example, intermediate node 124 may perform joint measurements on particles of entangled pairs 140 and 142 in order to distribute entanglement 144 between customer endpoints 128 and 130. In some embodiments respective particles of entangled pairs 140 and 142 that are received at intermediate node 124 may be stored in a quantum memory of intermediate node 124. This may allow for respective ones of the particles of entangled pairs 140 and 142 to be received at intermediate node 124 at different times, wherein an earlier arriving particle of a first entangled pair is stored in quantum memory while waiting for a later arriving particle of the other entangled pair to arrive at the intermediate node 124. Note that the ability to store entangled quantum particles in a memory at an intermediate node without breaking entanglement or collapsing superposition may significantly reduce latencies for providing distributed entanglement. For example, instead of having to repeatedly send quantum particles of entangled pairs to intermediate node 124 attempting to synchronize arrival of the entangled particles, a first arriving particle can be used even if a second arriving particle arrives at a later time.

Figure 2A:
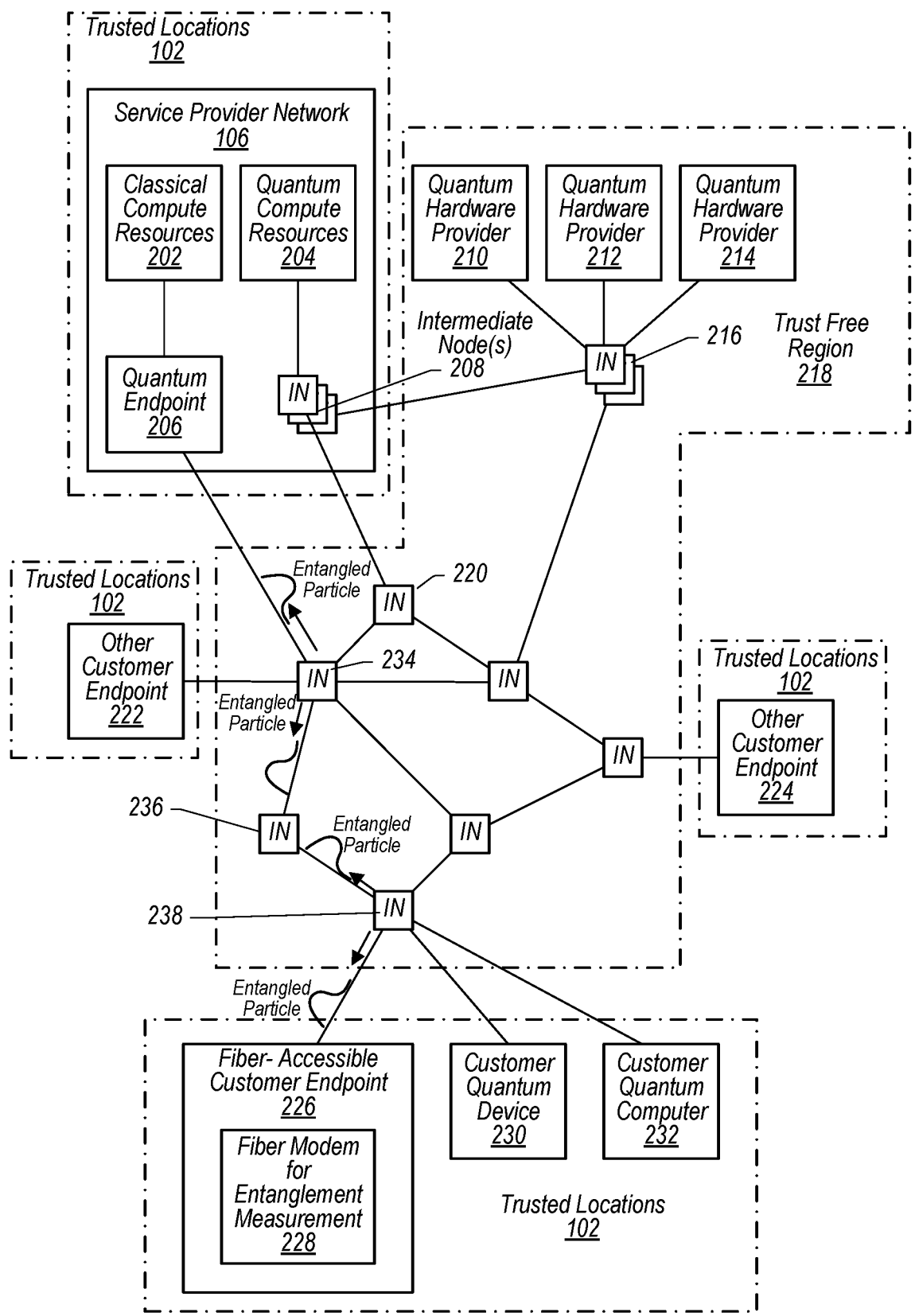
FIG. 2A illustrates resources of a service provider network that provides quantum entanglement distribution to customer endpoints connected to intermediate nodes in a trust-free region outside of the trusted locations of the service provider network, according to some embodiments.

FIG. 2A illustrates resources of a service provider network that provides quantum entanglement distribution to customer endpoints connected to intermediate nodes in a trust-free region outside of the trusted locations of the service provider network, according to some embodiments.

In some embodiments, distribution of quantum entanglement may include distribution using multiple intermediate nodes and may be used to distribute quantum entanglement to various types of endpoints. In some embodiments, locations outside of the trust guarantees of service provider network 106 (e.g., locations 104 illustrated in FIG. 1) may include intermediate nodes 220 located in trust free region 218. Also, in some embodiments service provider network 106 may further include intermediate nodes 208. Additionally, in some embodiments, intermediate nodes 216, which may be included in trusted locations 102 or trust free region 218, may connect service provider network 106 to quantum hardware providers 210, 212, and/or 214 that offer one or more types of quantum computing resources to customers of service provider network 102. For example, quantum hardware providers 210, 212, and 214 may be connected to service provider network 102 via intermediate nodes 216 and/or may be connected to other intermediate nodes in trust free region 218 via intermediate nodes 216. Additionally, various different customers of service provider network may be connected in a way that distributed quantum entanglement can be distributed to the various other customers. For example, other customer endpoints 222 and 224 are connected to intermediate nodes 220 in trust free region 218.

In some embodiments, a customer endpoint, such as customer endpoint 126 shown in FIG. 1 may include one or more types of endpoint devices. For example, in some embodiments customer endpoint 126 may include a fiber-accessible customer endpoint 226, which is connected to a fiber modem for entanglement measurement 228.

Additionally, or alternatively customer endpoint 126 may include a customer quantum device 230, for example for performing quantum measurements, or may include a full-fledged customer quantum computer 232.

In some embodiments, customer quantum computing device 230 and/or customer quantum computer 232 may further include a conversion interface. For example, in some embodiments, the conversion interface may convert a transmission frequency of a received particle to a different frequency and/or convert a frequency of an outgoing particle to a different frequency. For example, in some embodiments, fiber optical links may transmit photons using different frequency wavelengths and such variations may be adjusted via a conversion interface of customer quantum computing device 230 and/or customer quantum computer 232.

In some embodiments, the classical computing services 110 of service provider network 106 (illustrated in FIG. 1) may be implemented using classical computing resources 202 (as shown in FIG. 2A). Also, in some embodiments, the quantum computing services 108 (illustrated in FIG. May be implemented using quantum computing resources 204 of service provider network 106 or may be implemented using quantum processing units (QPUs) of quantum hardware providers 210, 212, or 214 connected to service provider network 106 via intermediate nodes 208 and/or 216 (as shown in FIGS. 2A and 2B).

As an example, a customer associated with fiber-accessible customer endpoint 226 may request entanglement distribution between fiber-accessible customer endpoint 226 and service provider network 106 in order to provide quantum secure communication between fiber-accessible customer endpoint 226 and classical compute resources 202 providing classical computing services to the customer. In response, routing selection module 118 (as shown in FIG. 1) may cause intermediate node 234 (which may be an entangled particle source node) to distribute respective particles of entangled particle pairs to quantum endpoint 206 and intermediate node 236 (which may be a quantum repeater node). Also, routing selection module 118 may cause intermediate node 238 (which may be an entangled particle source node) to distribute respective particles of entangled particle pairs to fiber-accessible customer endpoint 226 and intermediate node 236 (e.g., a quantum repeater node). Additionally, routing selection module 118 may instruct intermediate node 236 to perform joint quantum measurements on the received entangled quantum particles to extend the quantum entanglement such that quantum entanglement is distributed between quantum endpoint 206 and fiber-accessible customer endpoint 226. Because quantum endpoint 206 is within trusted location 102 (e.g., located at a data center with classical compute resources 202), secure communications may be exchanged between fiber-accessible customer endpoint 226 and classical compute resources 202 without concern for third parties intercepting or altering the communications as they flow through trust free region 218. Note that, in a similar manner, secure communications may be extended to quantum computing resources 204 and/or QPUs of quantum hardware providers 210, 212, or 214.

Note that as shown in FIG. 2A a given intermediate node such as intermediate node 220, 234, 208, 216, etc. may be connected to more than two network links. Thus, routing selection module 118 may selective respective links to be used for a given intermediate node to form part of a network path from a larger group of network links connected to the respective intermediate node. In this way various different network paths for distributing quantum entanglement may be performed by selecting different combinations of network links from a larger set of network links connected to the respective ones of the intermediate nodes.

Figure 2B:
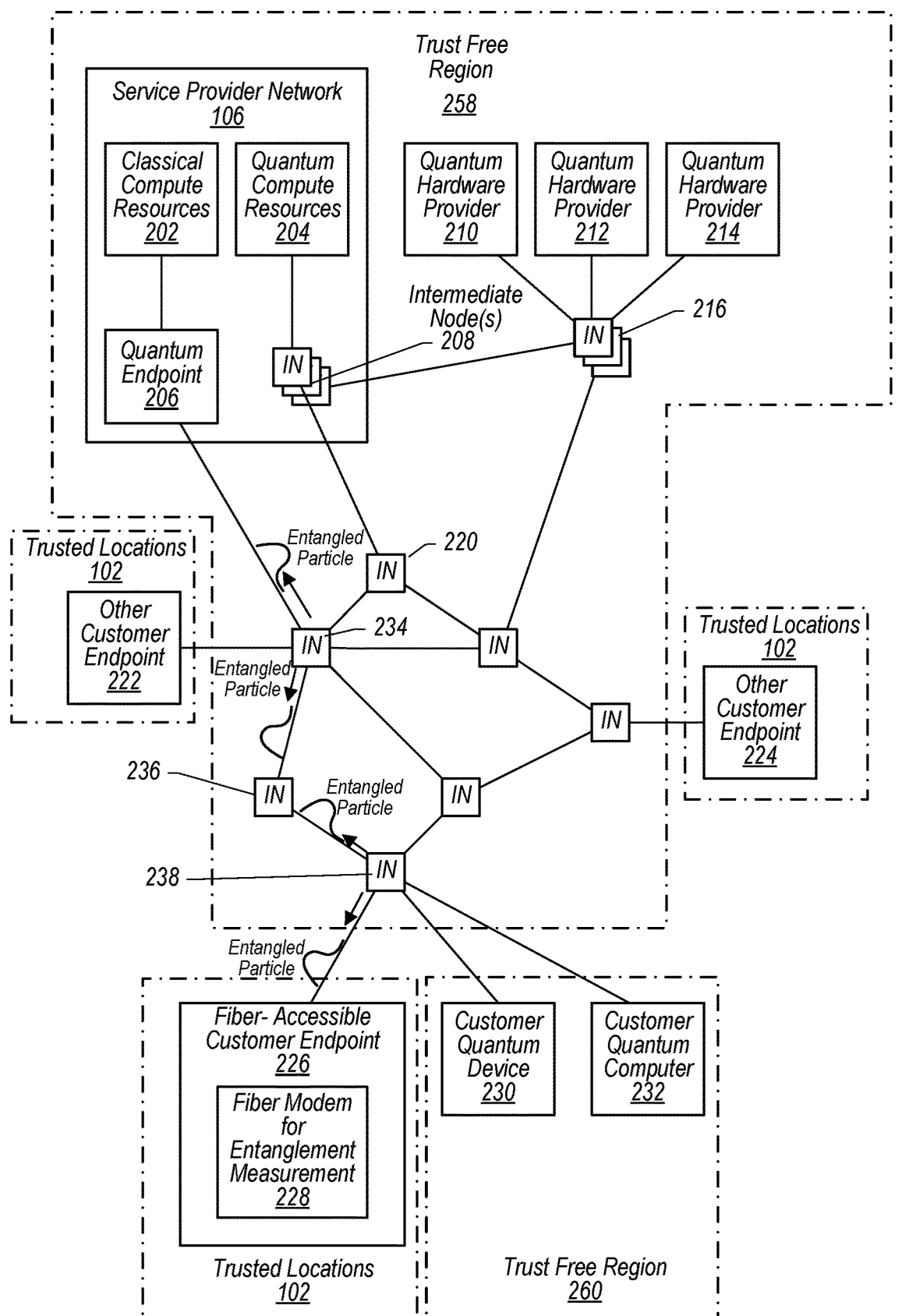
FIG. 2B illustrates quantum entanglement distribution to customer endpoints located at trusted locations via intermediate nodes in a trust-free region, wherein at least some portions of the service provider network are not required to be located at trusted locations, according to some embodiments.

FIG. 2B illustrates quantum entanglement distribution to customer endpoints located at trusted locations via intermediate nodes in a trust-free region, wherein at least some portions of the service provider network are not required to be located at trusted locations, according to some embodiments.

In some embodiments, the service provider network 106, or portions thereof, may be located in trust free region 258, whereas customer endpoints, such as fiber-accessible customer endpoint 226, customer quantum device 230, customer quantum computer 232, other customer endpoint 222, and other customer endpoint 224 are located at trusted locations 102. For example, service provider network 106 may include quantum entanglement distribution service 112 as illustrated in FIG. 1 that provides quantum entanglement distribution between customer endpoints that are located at trusted locations 102. However, in some embodiments, it may not be necessary for a data center or other portion of service provider network 106 to also be located at a trusted location. For example, in some embodiments, endpoints of the distributed quantum entanglement are located at trusted locations, but the quantum entanglement distribution service that causes the entanglement to be distributed is not required to be located at a trusted location. Though, in some embodiments, service provider network 106, may be located at a trusted location regardless of whether or not resources of the service provider network 106 are being used as endpoints for the distributed quantum entanglement. Though, as mentioned above, in some embodiments such placement of the resources of the service provider network at trusted locations in not strictly necessary.

Also, in some embodiments, customer quantum devices, such as customer quantum device 230 or customer quantum computer 232, may be located at trusted locations, as shown in FIG. 2A, or may be located in a trust free region 260 as illustrated in FIG. 2B. For example, in some embodiments, quantum computing may be performed using quantum entanglement between a quantum device or quantum computer at a first endpoint and a second endpoint connected via distributed quantum entanglement. In such a situation, customer information may be stored as quantum information (e.g., qubits) without being read out into classical information at the first location where the quantum device is located. Because the quantum information cannot be intercepted or altered without alerting the customer to such activity, such as by collapsing a superposition state of the qubit, protection against unauthorized access is provided at quantum computing devices, even if not located at trusted locations.

FIG. 3 illustrates intermediate nodes used in entanglement distribution, wherein the intermediate nodes distribute entangled particle pairs (e.g., pairs of optical photons) via network links to distribute entanglement between a set of endpoints for which entanglement distribution has been requested, according to some embodiments.

In some embodiments, an intermediate node, such as those shown in any of FIGS. 1, 2, and 6-11, may include quantum repeaters, such as quantum repeaters 302 and 310 as shown in FIG. 3. In some embodiments, the intermediate nodes may also include entangled quantum particle source nodes, such as entangled quantum particle source nodes 314, 316, and 318 as shown in FIG. 3.

In some embodiments, a quantum repeater node, such as quantum repeater nodes 302 and 310, may include a quantum memory 308 configured to store received quantum particles of a set of entangled quantum particles. For example, a quantum memory 308 may further include components as described in the example quantum memory shown in FIG. 5. Additionally, repeater nodes 302 and 310 include entanglement measurement device 306 configured to perform joint quantum measurements on quantum particles stored in quantum memory 308, in order to determine a correlation relationship between stored quantum particles of respective pairs of entangled quantum particles (e.g., do the stored particles of the respective pairs of entangled particles have a same or opposite relationship). Additionally, quantum repeaters nodes 302 and 310 include a measurement communication interface 304 configured to provide the results of the joint measurements performed by entanglement measurement device 306 to respective endpoints, such as customer endpoint 312 and customer or third-party endpoint 320 to which the quantum entanglement is being distributed.

For example, in order to distribute quantum entanglement between customer endpoint 312 and customer (or third-party) endpoint 320, routing selection module 118 of quantum entanglement distribution service 112 may cause entangled particle source node 314 to distribute respective particles of an entangled particle pair to customer endpoint 312 and to quantum repeater 302 via fiber links connecting the entangled particle source node 314 to the customer endpoint 312 and connecting the entangle particle source node 314 the quantum repeater node 302. Additionally, routing selection module 118 of quantum entanglement distribution service 112 may cause entangled particle source node 318 to distribute respective particles of an entangled particle pair to customer endpoint 320 and to quantum repeater 302 via fiber links connecting the entangled particle source node 318 to the customer endpoint 320 and connecting the entangle particle source node 318 to the quantum repeater node 302. The quantum repeater node 302 may store the respective quantum particles received from entangled particle source nodes 314 and 318 in respective superposition states in quantum memory 308. Additionally, quantum repeater node 302 may perform joint measurements on the stored particles using entanglement measurement device 306 and may provide the results of the joint measurement to the respective endpoints 312 and 320 via measurement communication interface 304. For example, an entanglement measurement result 324 may be provided to customer endpoint 312 and an entanglement measurement result 322 may be provided to customer (or third-party) endpoint 320. The entanglement measurement results 322 and 324 may be transmitted via classical communication channels, such as the internet or other suitable communication channels. In some embodiments, the communication of the joint measurements may be performed using a public communication channel without compromising the security or privacy of the distributed quantum entanglement. For example, if a third-party were to intercept the joint measurements, such information could not be used to read or alter information communicated via the distributed quantum entanglement by others not sharing the distributed quantum entanglement. In some embodiments, additional basis measurements may be included with measurements 322 and 324, wherein the basis indicates which basis (e.g. X, Y, Z, etc.) is to be used at either endpoint e.g. customer endpoint 312 and customer or third party endpoint 320, wherein both the entanglement measurements (e.g. joint measurements) and the measurement basis enable quantum data to be communicated between the endpoints, such as communication of symmetric encryption keys, or communication of quantum information via quantum teleportation.

Figure 12:
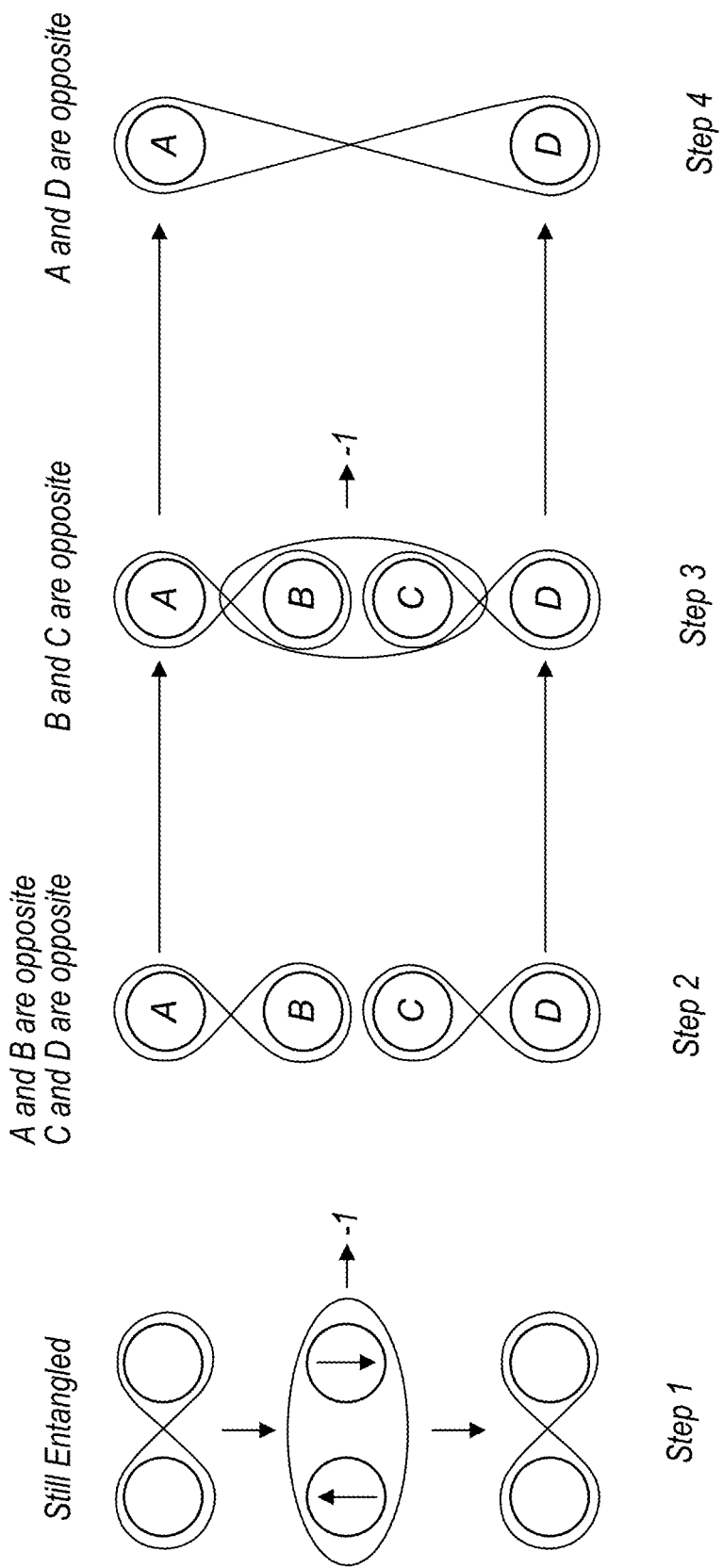
FIG. 12 is an example diagram illustrating how entanglement is extended at an intermediate node by performing joint measurements of received particles of respective sets of entangled particles distributed via network links, according to some embodiments.

In some embodiments, the measurement results may be provided to quantum entanglement distribution service 112, and the service may provide cumulative results to respective endpoints, such as customer endpoint 312 and customer (or third-party) endpoint 320. Note that FIG. 12 provides additional details regarding how the joint measurements performed at entanglement measurement device 306 may be performed. Further note that the entangled particles are distributed from the entangled particle source nodes 314, 316, and 318 in a superposition state, are stored in the quantum memory 308 in the superposition state, and the joint measurements are performed via entanglement measurement device 306 in the superposition state without collapsing the particles out of the superposition state. This can be contrasted with other methods that perform quantum measurements at connecting nodes that cause the entangled particles to collapse out of the superposition state, thus providing a gap in the quantum security and/or privacy that could be exploited by a malevolent actor to eavesdrop on or alter the communication.

Figure 4:
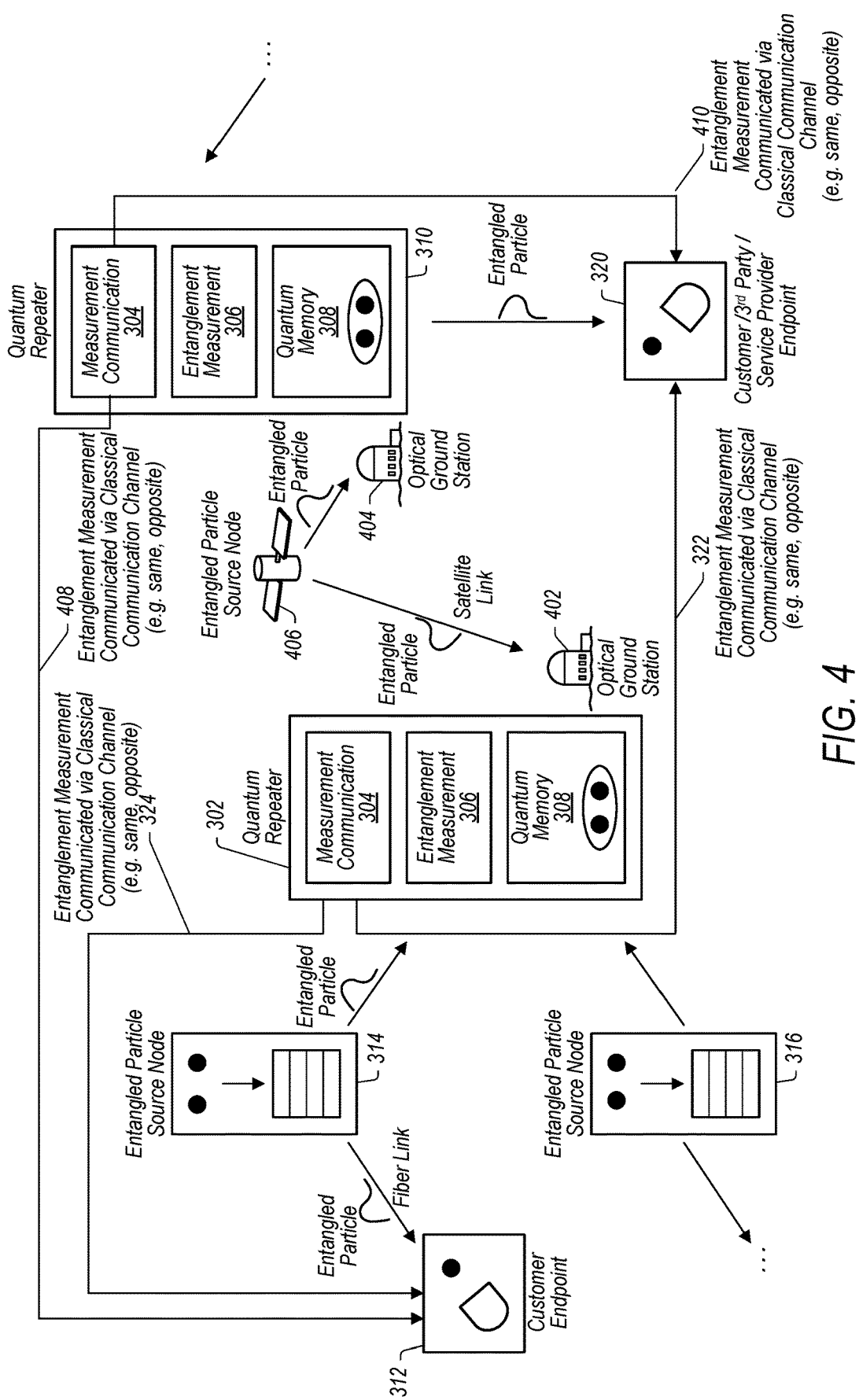
FIG. 4 illustrates another example of intermediate nodes used in entanglement distribution, wherein at least some of the intermediate nodes are connected via satellite links, according to some embodiments.

FIG. 4 illustrates another example of intermediate nodes used in entanglement distribution, wherein at least some of the intermediate nodes are connected via satellite links, according to some embodiments.

In some embodiments, a quantum entanglement distribution service may include or use a satellite and optical ground stations to distribute quantum entanglement. For example, in order to distribute quantum entanglement across large distances, a satellite and set of optical ground stations may be used, in some embodiments. FIG. 4 illustrates a similar network as shown in FIG. 3, except entangled particle source node 318 has been replaced with entangled source node 406 located in a satellite. Also optical ground station 402 receives an entangled particle of a pair of entangled particles generated by entangled particle source node 406 and optical ground station 404 receives the other particle of the entangled pair. Thus, quantum repeater 302 and 310 are connected via entangled particle source node 406 included in a satellite and via optical ground stations 402 and 404. Quantum repeater 310 may distribute a quantum particle of an entangled pair of quantum particles to customer (or third-party) endpoint 320 and store the other particle of the entangled pair of particles in quantum memory 308 of quantum repeater 310. Additionally, quantum repeater 310 may store a quantum particle received from entangled source node 406 via optical ground station 404 in quantum memory 308 of quantum repeater 310. Entanglement measurement device 306 of quantum repeater 310 may perform joint measurements on the stored quantum particles of the respective pairs of entangled quantum particles. Additionally, measurement communication interface 304 of quantum repeater 310 may provide results (408 and 410) of the joint measurement to customer (or third-party) endpoint 320 and to customer endpoint 312. In some embodiments, instead of providing results of each joint measurement performed at a respective quantum repeater, the quantum entanglement distribution service may provide an overall result (e.g., same or opposite) to the respective endpoints to which quantum entanglement is being distributed.

Figure 5:
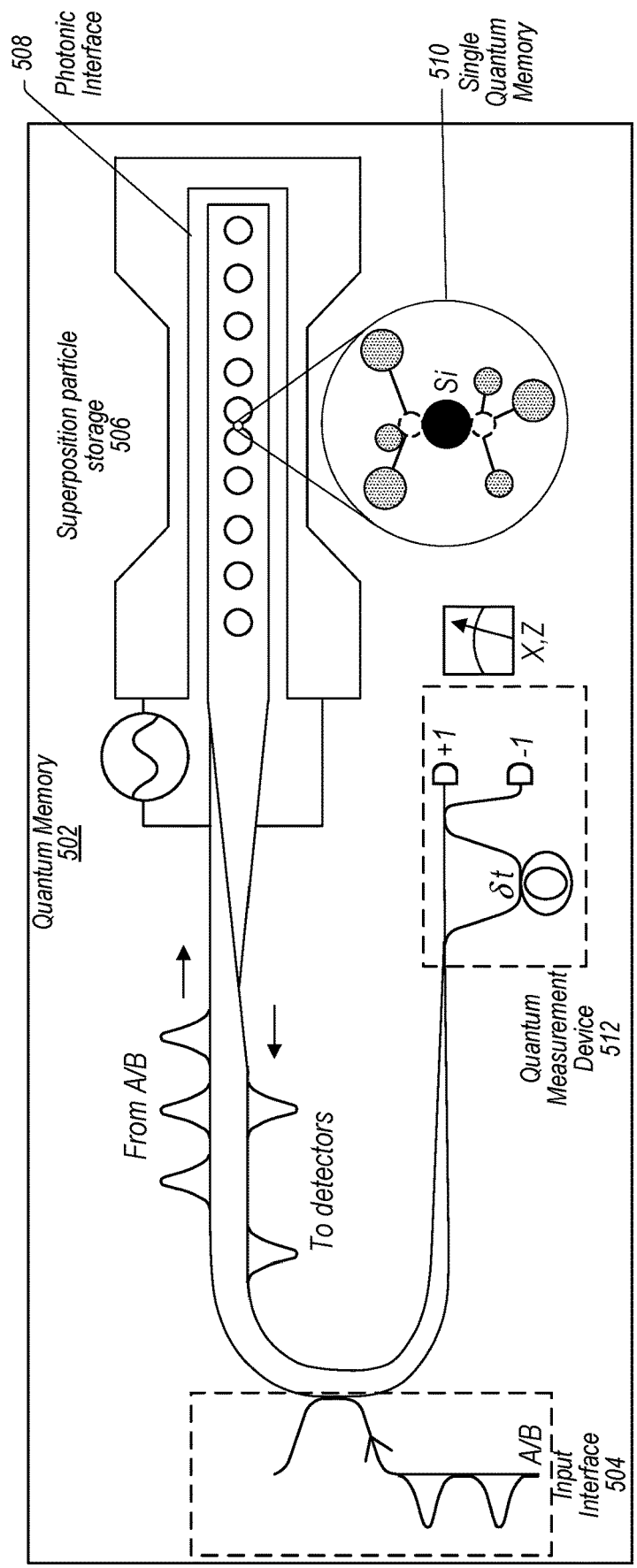
FIG. 5 illustrates an example quantum memory that may be included in an intermediate node, according to some embodiments.

FIG. 5 illustrates an example quantum memory that may be included in an intermediate node, according to some embodiments.

In some embodiments, quantum memories 308 as described in FIGS. 3 and 4 may include similar arrangements as quantum memory 502 illustrated in FIG. 5. Though in some embodiments, other quantum memory configurations may be used. Quantum memory 502 includes in input interface 504 that receives particles in a superposition state, superposition particle storage 506, which may, in some embodiments, include a photonic interface 508 comprising single quantum bit 510, and quantum measurement device 512. For example, single quantum bit 510 illustrates a silicon vacancy in diamond structure. Though in some embodiments, other structures such as: nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc. may be used.

In some embodiments, quantum memory 502 may be configured to store a first received entangled particle of a first pair of entangled particles in a first single quantum bit 510 of photonic interface 508 of superposition particle storage 506 and also store a second received entangled particle of a second pair of entangled particles in a second single quantum bit 510 of photonic interface 508 of superposition particle storage 506. The quantum memory 502 may further be configured to perform one or more joint measurements on the first and second particles via quantum measurement device 512 without collapsing superposition states of the first and second entangled particles. The joint measurements may determine a correlation relationship between the superposition states of the entangled particles such that entanglement can be extended between the pairs of entangle particles.

The quantum memory 502 may be heralded, meaning that when a particle arrives and is stored in a single quantum bit 510, the quantum measurement device 512 (or other device of the quantum memory 502) issues a heralding signal announcing the arrival of the particle. In some embodiments, such a heralding signal may be used to operate an optical switch to align the switch such that the quantum memory receives a next particle from an entangled particle source with which quantum entanglement is to be distributed. Furthermore, when the second particle arrives at the quantum memory 502 from the entangled particle source, a second heralding signal may be issued. The second heralding signal may then cause joint measurements to be performed on the first and second particles stored in the quantum memory 502. Furthermore, the joint measurements may extend the entanglement. In some embodiments, quantum measurement device 512 may perform heralding measurements and joint measurements, or in some embodiments, different quantum measurements devices 512 may be used to perform heralding measurements and joint measurements on received particle pairs. In some embodiments, the heralding function may be performed by a quantum nondestruction measuring device that can detect a particle (e.g., photon) entering the quantum memory 502 without causing the particle to be collapsed out of the superposition state.

In some embodiments, quantum memory 502 may further include a conversion interface. For example, in some embodiments, the conversion interface may convert a transmission frequency of a received particle to a different frequency. For example, in some embodiments, fiber optical links may transmit particles using different frequency wavelengths and such variations may be adjusted via a conversion interface of quantum memory 502. In some embodiments, the conversion interface may be located proximate to the quantum memory device 502, but may not necessarily be included in the quantum memory device 502. As another example, particles received at a quantum repeater via optical ground stations, such as optical ground stations 402 and 404 illustrated in FIG. 4, and particles received at the quantum repeater via fiber links may be transmitted at different wavelengths and a conversion interface of the quantum repeater may convert the wavelength of the received particles to a wavelength used by quantum memory device 512 to store quantum particles.

In some embodiments, quantum memory 502 (or sets of quantum memories) may store redundant sets of particles for use in generating quantum entanglement that is to be distributed. In such embodiments, the quantum memor(ies) may perform error correction by comparing joint measurement results for multiple sets of particles. Such error correction may function as entanglement purification, in some embodiments. Also, parties at the endpoints connected via the redundantly distributed quantum entanglement may perform error correction.

Figure 6:
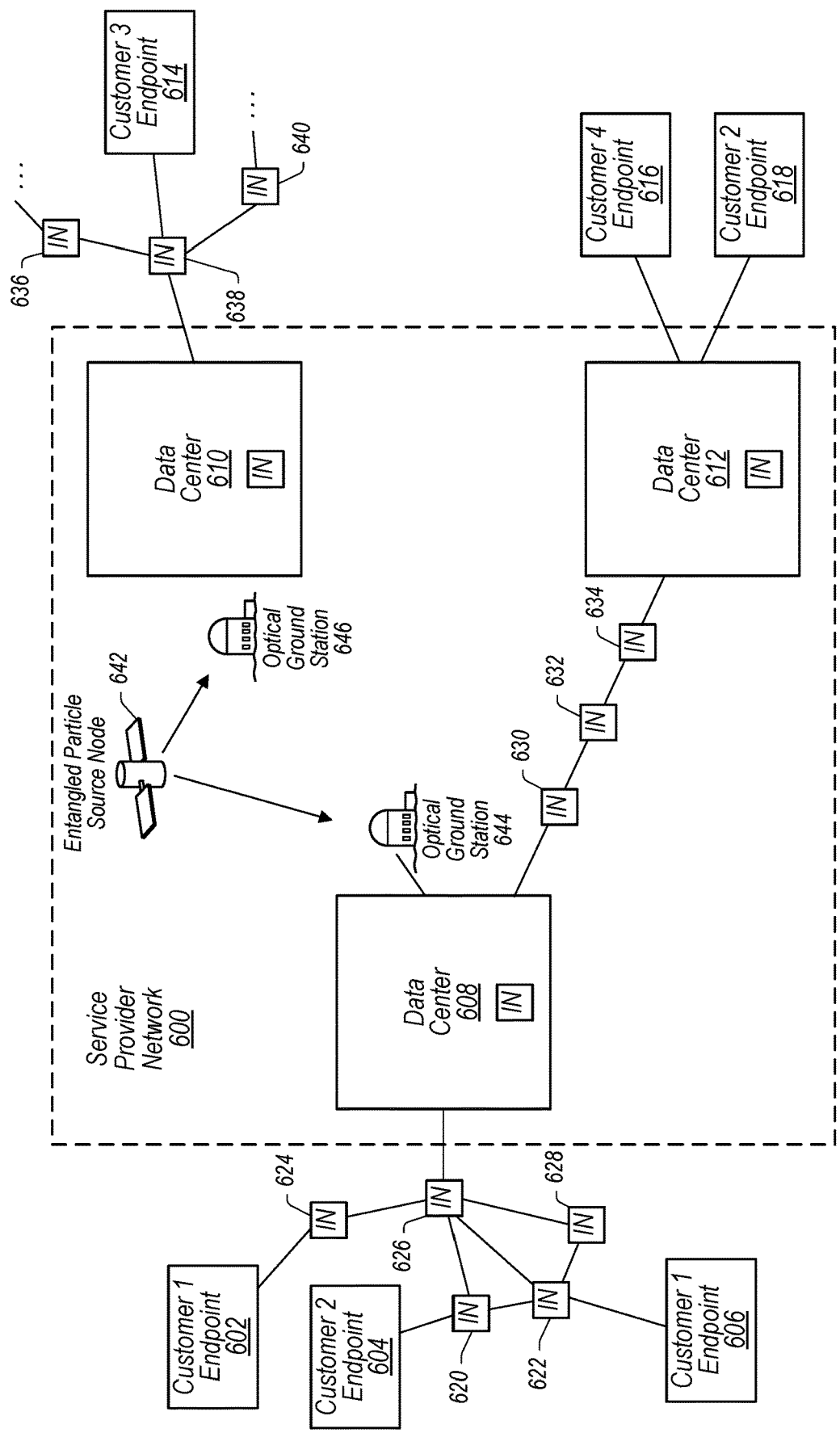
FIG. 6 illustrates an example service provider network and intermediate nodes that enable entanglement distribution between endpoints via an entanglement distribution service of the service provider network, according to some embodiments.

FIG. 6 illustrates an example service provider network and intermediate nodes that enable entanglement distribution between endpoints via an entanglement distribution service of the service provider network, according to some embodiments.

In some embodiments, a service provider network, such as service provider network 600 may include a quantum entanglement distribution service 112, which may be implemented in part at one or more data centers, such as data centers 608, 610 and/or data center 612. Also, quantum computing services and classical computing services, such as quantum computing services 108 and classical computing services 110, may be implemented at the data centers or at quantum hardware providers connected to the data centers. In some embodiments, a service provider network 600 may include intermediate nodes, such as intermediate nodes 630, 632, and 634 that connect data centers separated by significant geographic distances. Also, data centers of service provider network 600 may be connected via a satellite intermediate node 642 and optical ground stations 644 and 646.

In some embodiments, intermediate nodes of a quantum entanglement distribution service may be located outside of a service provider network, such as in a fiber network of a telecom provider, or fiber optic network of another third party that is not controlled by the service provider. For example, intermediate nodes 620, 622, 624, 626, and 628 are located in a third-party fiber optic network that connects to data center 608 and customer endpoints 602, 604, and 606. Note that in some embodiments, a same customer such as customer 1 may control more than one endpoint, wherein the endpoints of the customer are located in different locations. As another example, customer 2 endpoint 618 is directly connected to data center 612, while customer 2 endpoint 604 is connected to data center 608 via intermediate nodes 620 and 626. In some embodiments, customer 2 endpoints 604 and 618 may be geographically distant from one another. For example, they may be located on opposite coasts of the United States, or in different continents of the world. As yet another example, customer 3 endpoint 614 is connected to data center 610 via intermediate node 638, which in turn is connected via fiber links to intermediate nodes 636 and 640 which may extend to other customer endpoints or intermediate nodes of the quantum entanglement distribution service (which are not shown).

While not shown in FIG. 6, in some embodiments, the intermediate nodes may include some level of redundancy, such that there are multiple paths by which quantum entanglement may be distributed. Thus, if a given intermediate node is unavailable, quantum entanglement may be distributed using an alternate or redundant intermediate node.

Figure 7:
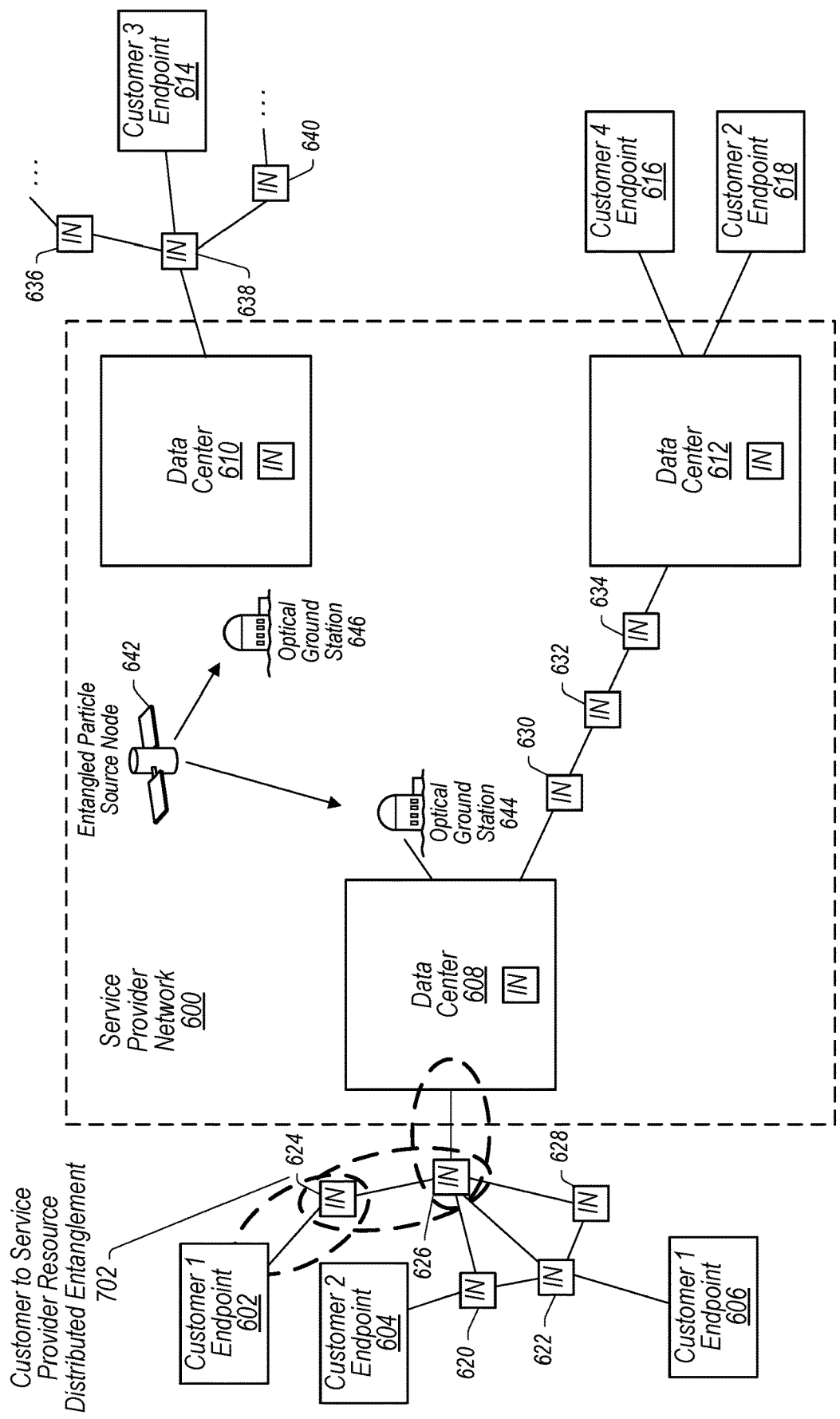
FIG. 7 illustrates a service provider network distributing entanglement between a data center of the service provider network and a customer endpoint in order to provide the customer with secure communications to resources allocated to the customer in the data center, according to some embodiments.

FIG. 7 illustrates a service provider network distributing entanglement between a data center of the service provider network and a customer endpoint in order to provide the customer with secure communications to resources allocated to the customer in the data center, according to some embodiments.

As an example, using the quantum entanglement distribution service intermediate nodes shown in FIG. 6, in FIG. 7 distributed entanglement 702 is provided between customer 1 endpoint 602 and data center 608 via a first set of entangled particles distributed between intermediate node 624 and customer 1 endpoint 602 (note that an entangled particle source node may be located midway between customer 1 endpoint 602 and intermediate node 624 and may distribute the respective entangled particles of the pair to customer 1 endpoint 602 and intermediate node 624). Similarly, a second set of entangled particles is distributed between intermediate node 624 and intermediate node 626. Finally entangled particles are distributed between intermediate node 626 and data center 608. In some embodiments, routing selection module 118 of quantum entanglement distribution service 112 may select intermediate nodes 624 and 626 in order to distribute quantum entanglement to customer 1 endpoint 602 from data center 608. In some embodiments, joint quantum measurements may be performed at intermediate nodes 624 and 626 in order to extend the quantum entanglement from data center 608 to customer 1 endpoint 602. Once the quantum entanglement is extended between data center 608 and customer 1 endpoint 602, the distributed quantum entanglement may be used to conduct quantum secure communications that cannot be interfered with or intercepted without knowledge of the communicating parties. For example, a secure symmetric encryption key may be distributed to customer 1 with assurance that no other party can intercept the secure encryption key. Also, classical or quantum information may be securely exchanged between customer 1 and services implemented at or through data center 608.

Figure 8:
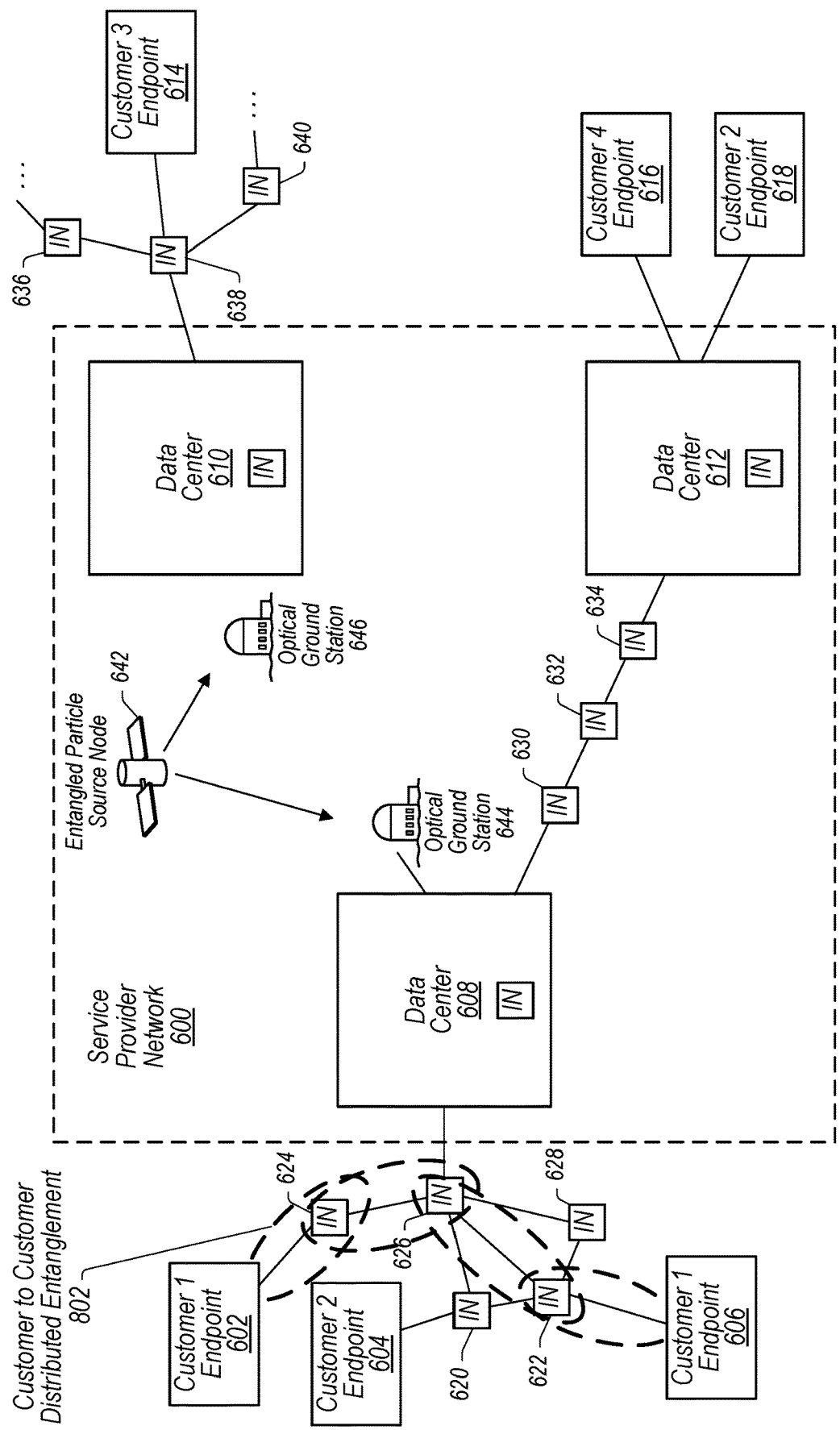
FIG. 8 illustrates a quantum entanglement distribution service distributing entanglement between a set of customer endpoints that are connected by third party network infrastructure, wherein the distributed entanglement provides the customer with secure communications between the customer endpoints that does not rely on the third-party network infrastructure to provide security or privacy for the secure communication, according to some embodiments.

FIG. 8 illustrates a quantum entanglement distribution service distributing entanglement between a set of customer endpoints that are connected by third party network infrastructure, wherein the distributed entanglement provides the customer with secure communications between the customer endpoints that does not rely on the third-party network infrastructure to provide security for the secure communication, according to some embodiments.

As another example, using the quantum entanglement distribution service intermediate nodes shown in FIG. 6, in FIG. 8 distributed entanglement 802 is provided between customer 1 endpoint 602 and customer 1 endpoint 606 via sets of entangled quantum particles distributed between intermediate nodes 622, 624, and 626. In some embodiments, quantum entanglement distribution service 112 may receive a request from customer 1 to distribute quantum entanglement between respective endpoints of customer 1 that are geographically separated. Routing selection module 118 may determine based on stored routing information in routing information store 116 a path between customer 1 endpoints 602 and 660 via intermediate nodes 622, 624, and 626 and respective intervening fiber links. The routing selection module 118 of the quantum entanglement distribution service 112 may further cause entanglement to be distributed between the intermediate nodes 622, 624, and 626, for example by distributing entangled particle pairs and performing joint quantum measurements at the intermediate nodes 622, 624, and 626. Once the quantum entanglement is extended between customer 1 endpoint 602 and customer 1 endpoint 606, the distributed quantum entanglement may be used to conduct quantum secure communications that cannot be interfered with or intercepted without knowledge of the communicating parties. For example, a secure symmetric encryption key may be distributed between customer 1 endpoints with assurance that no other party can intercept the secure encryption key. Also, classical or quantum information may be securely exchanged between customer 1 endpoints.

Figure 9:
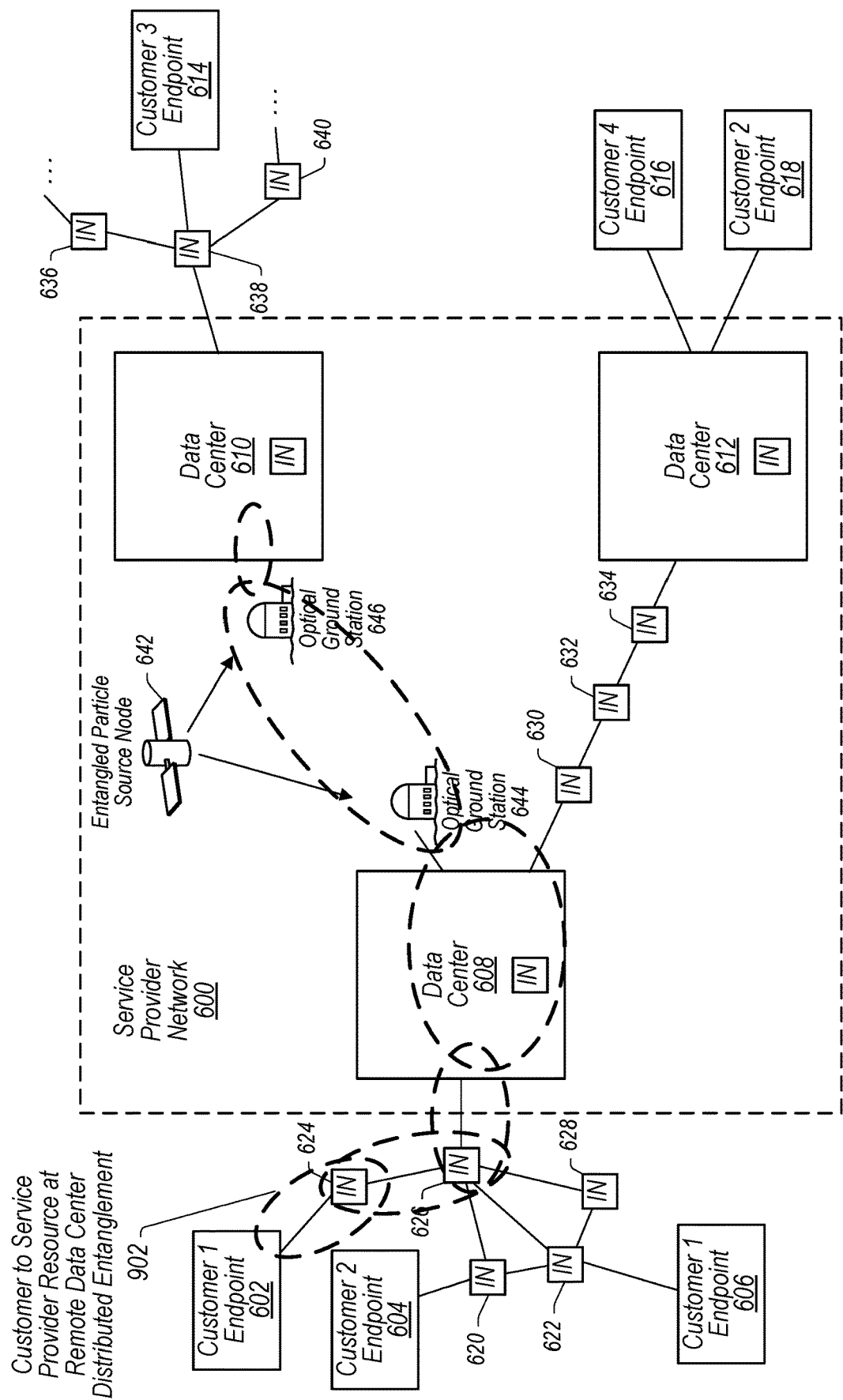
FIG. 9 illustrates a service provider network distributing entanglement between a remote data center of the service provider network and a customer endpoint in order to provide the customer with secure communications to resources allocated to the customer in the remote data center, according to some embodiments.

FIG. 9 illustrates a service provider network distributing entanglement between a remote data center of the service provider network and a customer endpoint in order to provide the customer with secure communications to resources allocated to the customer in the remote data center, according to some embodiments.

As yet another example, using the quantum entanglement distribution service intermediate nodes shown in FIG. 6, in FIG. 9 distributed entanglement 902 is provided between customer 1 endpoint 602 and data center 610 via a first set of entangled particles distributed between intermediate node 624 and customer 1 endpoint 602. Similarly, a second set of entangled particles is distributed between intermediate node 624 and intermediate node 626. Also, entangled particles are distributed between intermediate node 626 and data center 608. Additionally, entangled particles are distributed between data center 608 and optical ground station 644. Optical ground station 644 receives an entangled particle of an entangled particle pair distributed by entangled particle source node 642 included in a satellite and optical ground station 646 receives the other entangled particle of the entangled particle pair distributed by entangled particle source node 642 included in the satellite. Finally, an entangled particle pair is distributed between the optical ground station 646 and a quantum device 120 of data center 610. In some embodiments, joint measurements are performed at the various intermediate nodes of distributed quantum entanglement 902. In some embodiments, routing selection module 118 of quantum entanglement distribution service 112 may select intermediate nodes 624, 626, data center 608, optical ground station 644, satellite 642, and optical ground station 646 in order to distribute quantum entanglement to customer 1 endpoint 602 from data center 610. Once the quantum entanglement is extended between data center 610 and customer 1 endpoint 602, the distributed quantum entanglement may be used to conduct quantum secure communications that cannot be interfered with or intercepted without knowledge of the communicating parties. For example, a secure symmetric encryption key may be distributed to customer 1 with assurance that no other party can intercept the secure encryption key. Also, classical or quantum information may be securely exchanged between customer 1 and services implemented at or through data center 610.

Figure 10:
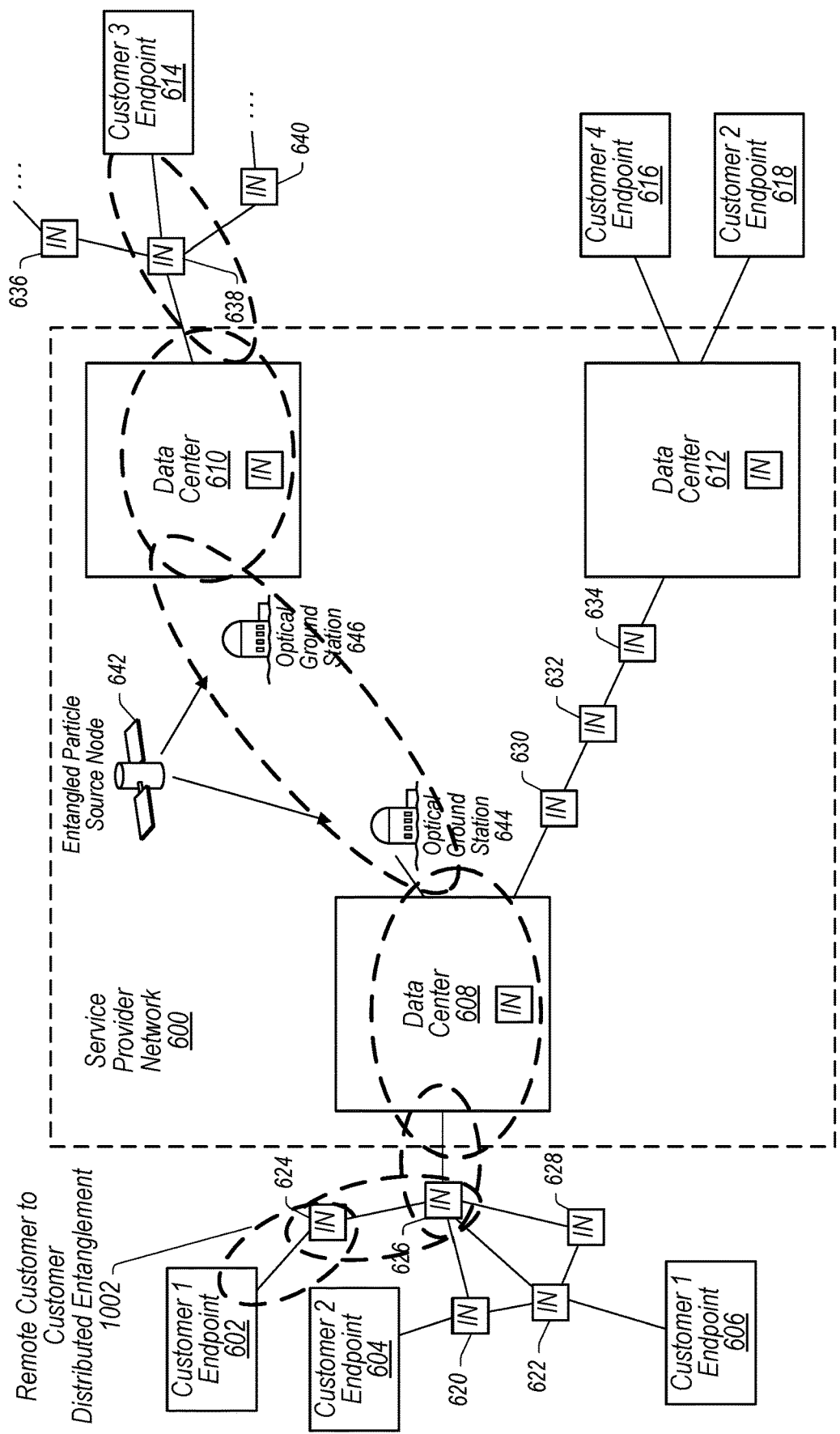
FIG. 10 illustrates a quantum entanglement distribution service distributing entanglement between a set of remote customer endpoints that are connected by third party network infrastructure and service provider network infrastructure, wherein the distributed entanglement provides the customer with secure communications between the remote customer endpoints that does not rely on the third party network infrastructure to provide security or privacy for the secure communication, according to some embodiments.

FIG. 10 illustrates a quantum entanglement distribution service distributing entanglement between a set of remote customer endpoints that are connected by third party network infrastructure and service provider network infrastructure, wherein the distributed entanglement provides the customer with secure communications between the remote customer endpoints that does not rely on the third party network infrastructure to provide security for the secure communication, according to some embodiments.

As yet another example, using the quantum entanglement distribution service intermediate nodes shown in FIG. 6, in FIG. 10 distributed entanglement 1002 is provided between customer 1 endpoint 602 and customer 3 endpoint 614 via sets of entangled quantum particles distributed between intermediate nodes 622, 624, 626, data center 608, optical ground stations 644 and 646, data center 610, and intermediate node 638. For example, a quantum entanglement distribution service may distribute quantum entanglement to endpoints of different customers that are separated by significant geographic distances, such as being located on opposite coasts or different continents.

Figure 11:
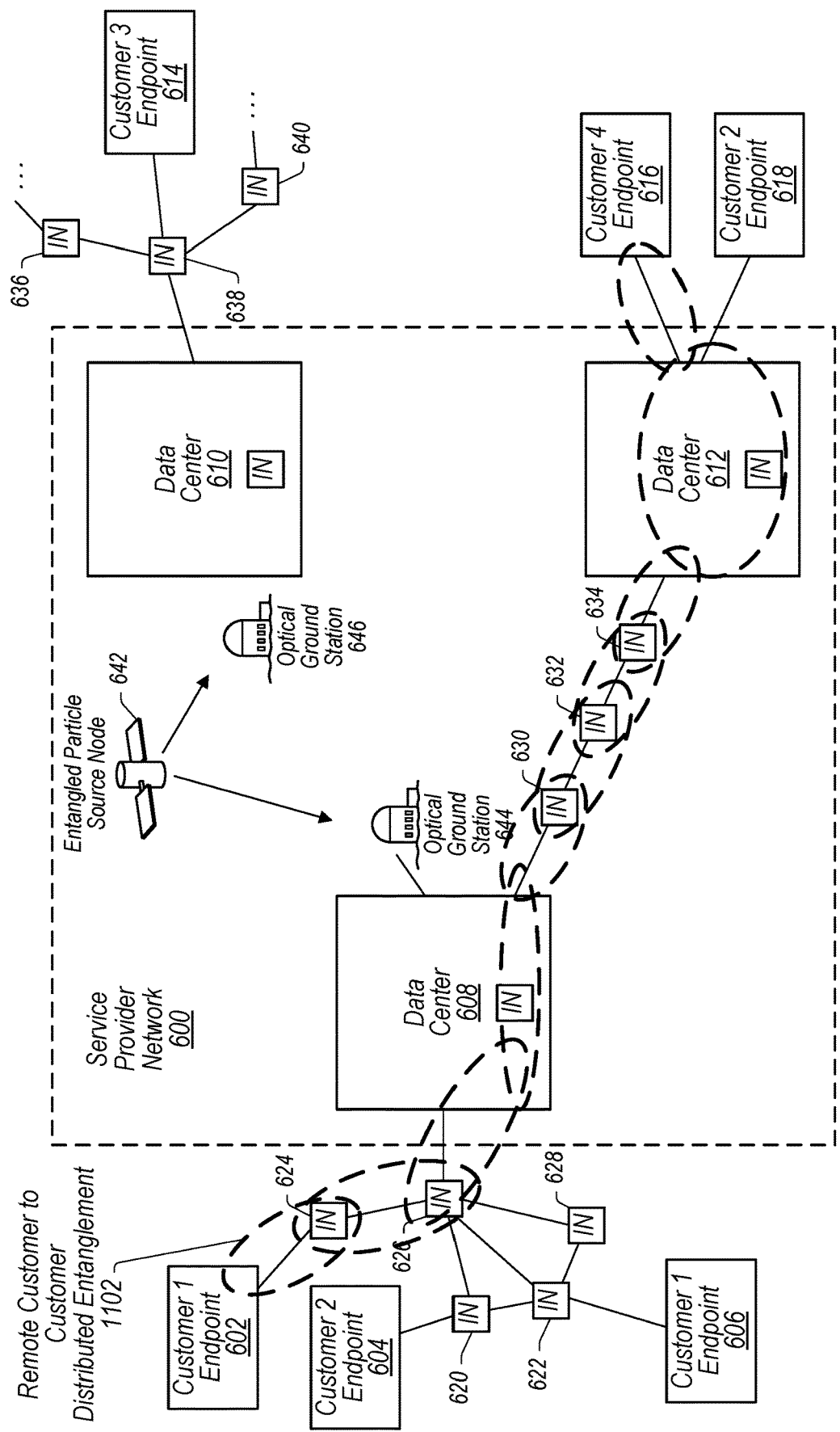
FIG. 11 illustrates a quantum entanglement distribution service distributing entanglement between a customer endpoint of a first customer and an endpoint of another customer at a remote location from the first customer, wherein the distributed entanglement is provided by third party network infrastructure and service provider network infrastructure, and wherein the distributed entanglement provides secure communications between the first customer and the other customer that does not rely on the third party network infrastructure to provide security or privacy for the secure communication, according to some embodiments.

FIG. 11 illustrates a quantum entanglement distribution service distributing entanglement between a customer endpoint of a first customer and an endpoint of another customer at a remote location from the first customer, wherein the distributed entanglement is provided by third party network infrastructure and service provider network infrastructure, and wherein the distributed entanglement provides secure communications between the first customer and the other customer that does not rely on the third party network infrastructure to provide security for the secure communication, according to some embodiments.

As yet an additional example, using the quantum entanglement distribution service intermediate nodes shown in FIG. 6, in FIG. 11 distributed entanglement 1102 is provided between customer 1 endpoint 602 and customer 4 endpoint 616 via sets of entangled quantum particles distributed between intermediate nodes 622, 624, 626, data center 608, intermediate nodes 630, 632, 634, and data center 612. For example, a quantum entanglement distribution service may distribute quantum entanglement to endpoints of different customers that are separated by significant geographic distances, via a series of intermediate nodes with or without using a satellite, in some embodiments.

FIG. 12 is an example diagram illustrating how entanglement is extended at an intermediate node by performing joint measurements of received particles of respective sets of entangled particles distributed via network links, according to some embodiments.

For example, at step 1, a joint measurement is performed that measures two particles in such a way as that the joint measurement only determines if the two particles are the same or opposite. This is done without revealing more information about the individual particles. Then, at step 2, the entangled pairs are defined by their correlations, e.g., opposite or the same. In the example shown in FIG. 12 both A/B and C/D are entangled such that they are opposites. Next, at step 3 a joint measurement is performed on B/C with an outcome (e.g., opposite or same), which is opposite in the example case shown in FIG. 12. This tells A that its compliment is the opposite D's compliment, allowing A and D to infer they are opposites. Then, using this information at step 4 A/D are now entangled such that they are always in the opposite state. In some embodiments, the joint measurements may be performed using a local two-qubit gate between B and C (e.g., a CNOT gate) and may further include measuring each bit individually. This can be understood as an entangling operation and a measurement, or conversely as a single measurement in an "entangled basis." When the joint measurements are performed in this way, the results reveal information about the correlations between particles, such as particles B and C, but not information about the particles themselves. This is due to the entanglement generated by the two-qubit operation.

Figure 13:
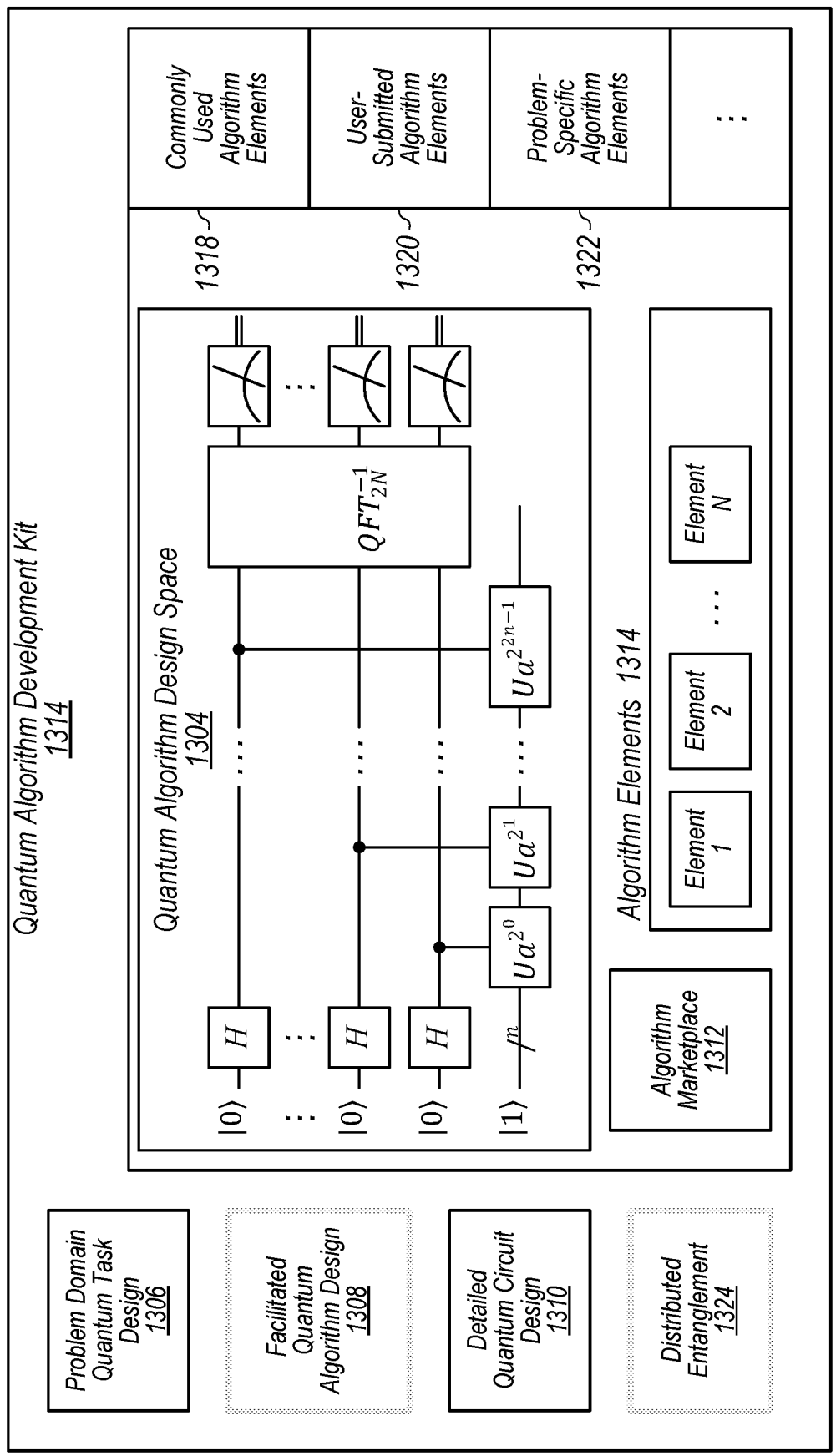
FIG. 13 illustrates an example quantum algorithm development kit of a quantum computing service of a service provider network that includes a distributed entanglement service, according to some embodiments.

FIG. 13 illustrates an example quantum algorithm development kit of a quantum computing service of a service provider network that includes a distributed entanglement service, according to some embodiments.

As an example, a customer may select to use a quantum algorithm design paradigm to define a quantum object to be executed via a quantum computing service and may additionally select that quantum entanglement is to be distributed to the customer for sending and/or receiving information to or from the quantum computing service (e.g., information to be executed using the quantum object which may be a quantum circuit executed on QPUs of the service provider network or a quantum hardware provider). For example, FIG. 13 illustrates quantum algorithm development kit 1314 with facilitated quantum algorithm design button 1308 selected. In this design paradigm, quantum algorithm design space 1304 may display a quantum algorithm being designed by the customer. As an example of a quantum algorithm, quantum algorithm design space illustrates an example view of Shor's algorithm which may be further modified by a customer or used to define a quantum object.

When the quantum algorithm design paradigm is selected, quantum algorithm logic element selection options such as 1318, 1320, and 1322 may be displayed. A customer may select one of the options, such as commonly used algorithm elements 1318 to cause commonly used algorithm elements to be displayed in algorithm elements 1314 at the bottom of the quantum algorithm design space 1304. The customer may then select quantum algorithm logic elements included in algorithm elements 1314 to define a quantum object (e.g., quantum algorithm) in design space 1304. Also, a customer may provide a defined quantum algorithm to an algorithm marketplace or use a quantum algorithm from a quantum algorithm marketplace by selecting algorithm marketplace option 1312.

In some embodiments, the customer may further select distributed entanglement 1324 to indicate information to be executed via the quantum algorithm, or results of execution of the quantum algorithm is to be communicated to or from the customer using secure quantum communications implemented using distributed entanglement.

FIG. 14 illustrates a quantum computing service of a provider network providing blind quantum computing services to a customer using generic quantum circuit, wherein the customer communicates a quantum circuit configuration (e.g., gates to include in the generic quantum circuit) using a distributed quantum entanglement in a way that hides the configuration from the service provider, according to some embodiments.

In some embodiments, quantum computing service 108 may provide a quantum computing resource 204 that includes a quantum processing unit that implements a generic quantum circuit 1402 that includes gates/quantum circuit configurations $U_1$, $U_2$, through $U_k$ that are blindly provider by the customer of the quantum computing service. Additionally, the generic quantum circuit 1402 may perform measurements to determine results $R_1$, $R_2$, through $R_j$. In such embodiments, encryption keys may be transmitted between the quantum computing service 108 and the customer endpoint 226 using quantum network 1404, such as distributed entanglement 138 between quantum device 120 and customer endpoint 126, as shown in FIG. 1. The encryption keys may be communicated as entanglement measurements $M_1$, $M_2$, through $M_n$. These encryption keys may be used to encrypt a quantum algorithm portion $U_i$ (e.g., quantum gate) that is to be executed using the generic quantum circuit 1402 and the results of such an execution may be encrypted by the blind quantum circuit 1402 and decrypted by the customer at classical computing device 1406 using a corresponding quantum entanglement measurement $M_i$ for a corresponding execution result $R_i$. In this way, both the quantum circuit configuration/quantum algorithm (e.g., gates) and the results may be encrypted such that that quantum algorithm run by the customer on quantum compute resources 204 and the corresponding results are not accessible by the service provider and/or any third-party that may attempt to monitor classical network 132.

Figure 15:
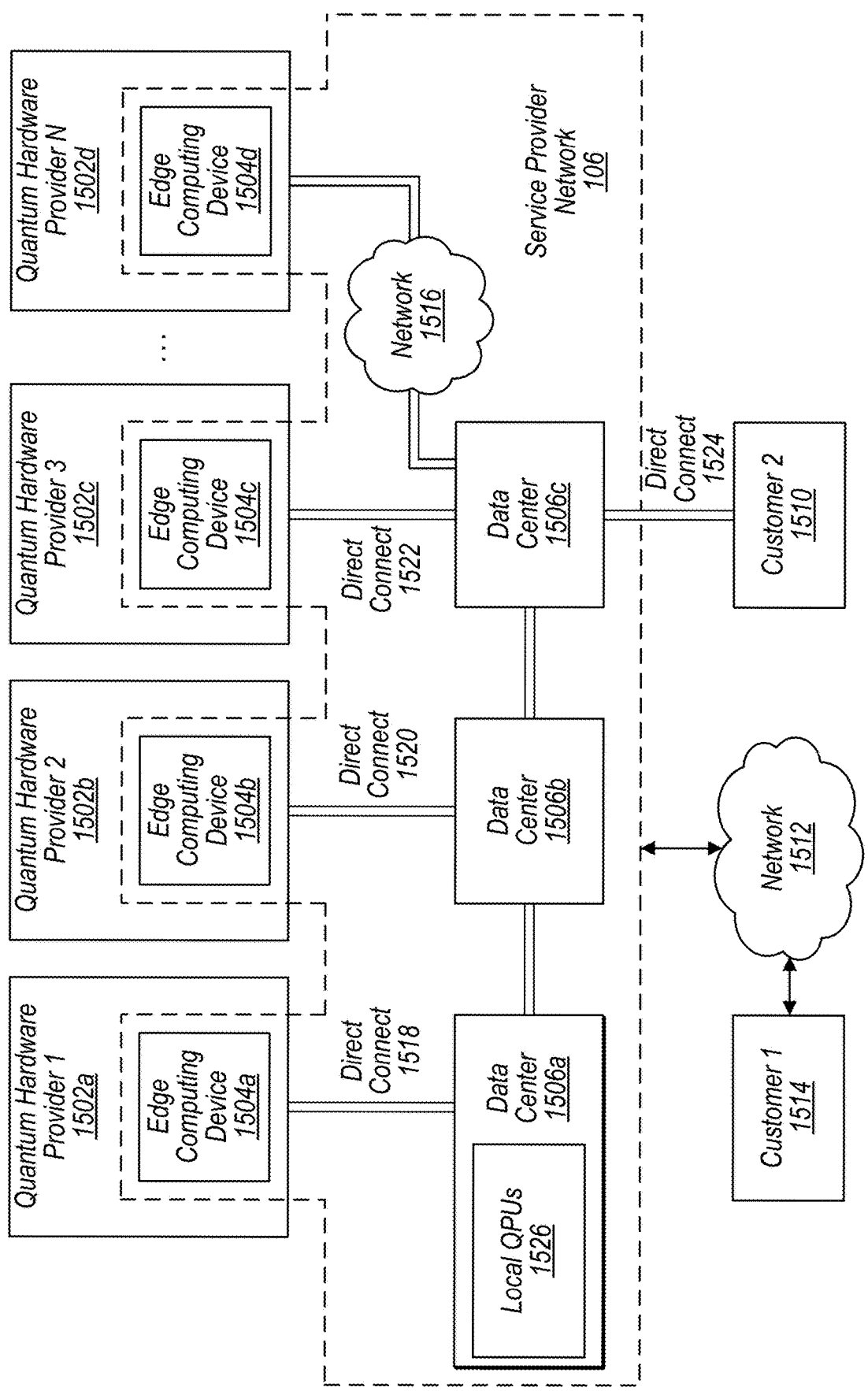
FIG. 15 illustrates an example service provider network that includes both classical computing resources and quantum computing resources that may be used to implement a quantum computing service and/or quantum entanglement distribution service, according to some embodiments.

FIG. 15 illustrates an example service provider network that includes both classical computing resources and quantum computing resources that may be used to implement a quantum computing service and/or quantum entanglement distribution service, according to some embodiments.

In some embodiments, service provider network 106 as illustrated in FIGS. 1 and 2 or service provider network 600 as illustrated in FIGS. 6-11, may include one or more data centers connected to each other via private or public network connections. Also, edge computing devices located at quantum hardware provider locations may be connected to a service provider network via private or public network connections. For example, service provider network 106 illustrated in FIG. 15 includes data centers 1506a, 1506b, and 1506c that are connected to one another via private physical network links of the service provider network 106. In some embodiments, a customer of the service provider network may also be connected via a private physical network link that is not available to the public to carry network traffic, such as a physical connection at a router co-location facility. For example, customer 1510 is connected to a router associated with data center 1506c via direct connection 1524. In a similar manner, edge computing devices located at quantum hardware provider locations may be connected to a service provider network via a private physical network link that is not available to carry public network traffic.

For example, edge computing device 1504a located at quantum hardware provider location 1502a is connected to a router at data center 1506a via direct connection 1518. In a similar manner, edge computing device 1504b at quantum hardware provider location 1502b is connected to a router at data center 1506b via direct connection 1520. Also, edge computing device 1504c at quantum hardware provider 1502c is connected to a router at data center 1506c via direct connection 1522.

Also, in some embodiments an edge computing device of a service provider network located at a quantum hardware provider location may be connected to the service provider network via a logically isolated network connection over a shared network connection, such as via the Internet or another public network. For example, edge computing device 1504d at quantum hardware provider location 1502d is connected to data center 1506c via a logically isolated network connection via network 1516. In a similar manner, in some embodiments a customer, such as customer 1514, may be connected to service provider network 1500 via public network 1512.

In some embodiments, a quantum computing service such as quantum computing service 108, may be implemented using one or more computing devices in any of data centers 1506a, 1506b, 1506c, etc. Also, the quantum computing service, may provide customers, such as customer 1514 or customer 1510, access to quantum computers in any of quantum hardware provider locations 1502a, 1502b, 1502c, 1502d, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology-based quantum computers. In some embodiments distributed quantum entanglement may be used to provide quantum secure communication channels between the quantum hardware providers and the respective data centers.

In some embodiments, one or more of the data centers 1506 may also include local quantum hardware devices, such as local QPUs 1526.

In some embodiments, a quantum computing service as described in FIG. 15 may be used to implement classical computing services 110 and quantum computing services 108 as described in FIG. 1.

Figure 16:
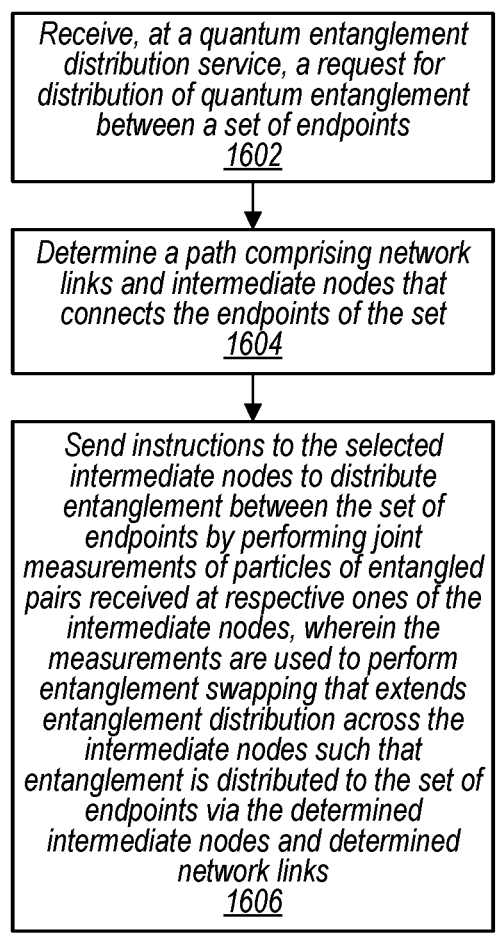
FIG. 16 is an example flow diagram for a process of distributing quantum entanglement using a quantum entanglement distribution service, according to some embodiments.

FIG. 16 is an example flow diagram for a process of distributing quantum entanglement using a quantum entanglement distribution service, according to some embodiments.

At block 1602, a quantum entanglement distribution service receives a request for distribution of quantum entanglement between a set of endpoints, such as any of the endpoints shown in FIGS. 6-11. The request may be received via a user interface 114 of the quantum entanglement distribution service 112, as an example. At block 1604, the quantum entanglement distribution service determines a path comprising network links and intermediate nodes that connects the endpoints indicated in the request. For example, a routing selection module 118 may use routing information about intermediate nodes stored in routing information store 116 to select a set of intermediate nodes and intervening links that provides a path between the endpoints indicated in the request received at block 1602. Then, at block 1606, the quantum entanglement distribution service sends instructions to the selected intermediate nodes to distribute entanglement between the set of endpoints by performing joint measurements of particles of entangled pairs received at respective ones of the intermediate nodes, wherein the measurements are used to perform entanglement swapping that extends entanglement distribution across the intermediate nodes such that entanglement is distributed to the set of endpoints via the determined intermediate nodes and determined network links. For example, in some embodiments, the routing selection module 118 of quantum entanglement distribution service 112 may coordinate sending the instructions to the selected intermediate nodes and/or providing results of the joint measurements to the endpoints.

Figure 17:
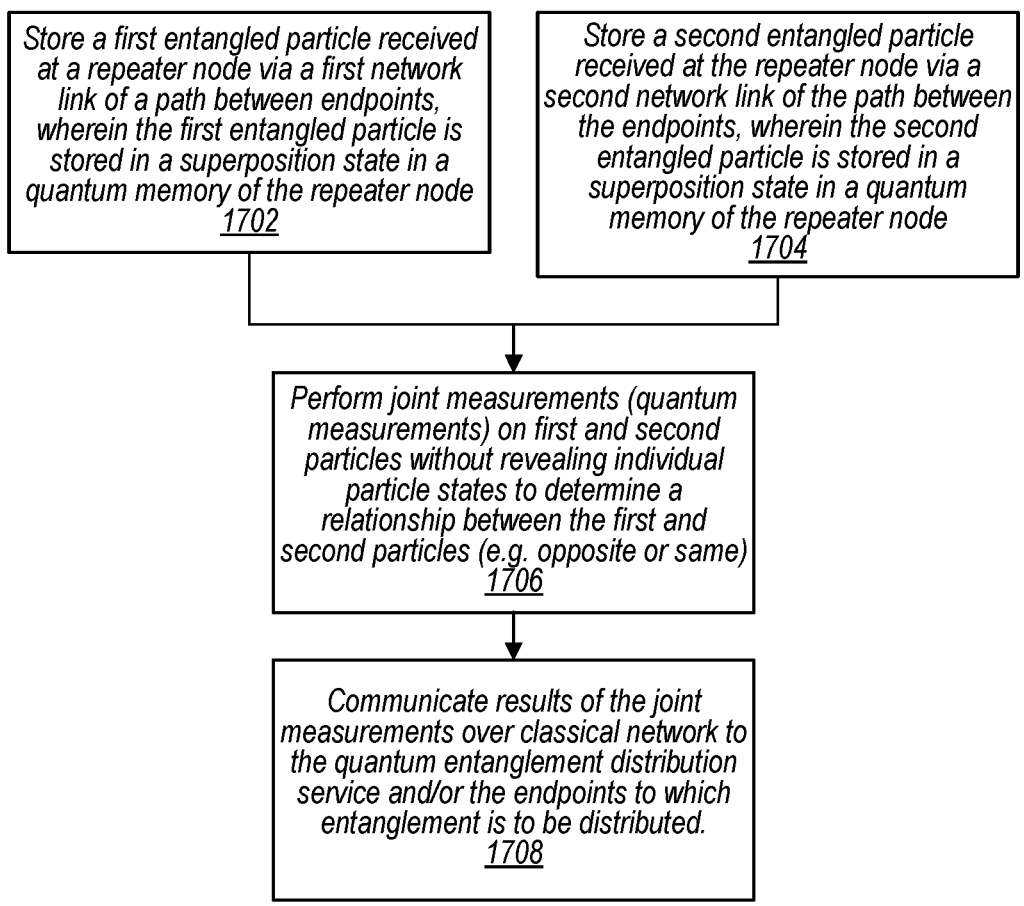
FIG. 17 is an example flow diagram for extending quantum entanglement distribution via a quantum repeater intermediate node of a quantum entanglement distribution service, according to some embodiments.

FIG. 17 is an example flow diagram for extending quantum entanglement distribution via a quantum repeater intermediate node of a quantum entanglement distribution service, according to some embodiments.

At block 1702, a quantum repeater, such as quantum repeater 302 or 310 illustrated in FIG. 3, stores a first entangled particle received at the repeater node via a first network link of a path between endpoints, wherein the first entangled particle is stored in a superposition state in a quantum memory of the repeater node. Also, at block 1704, the quantum repeater stores a second entangled particle received at the repeater node via a second network link of the path between the endpoints, wherein the second entangled particle is stored in a superposition state in a quantum memory of the repeater node. At bock 1706 the quantum repeater performs joint measurements (quantum measurements) on the first and the second particles without collapsing superposition states of the first and second particles to determine a relationship between the first and second particles (e.g., opposite or same). At block 1708, the quantum repeater then communicates out the results of the joint measurements.

Figure 18:
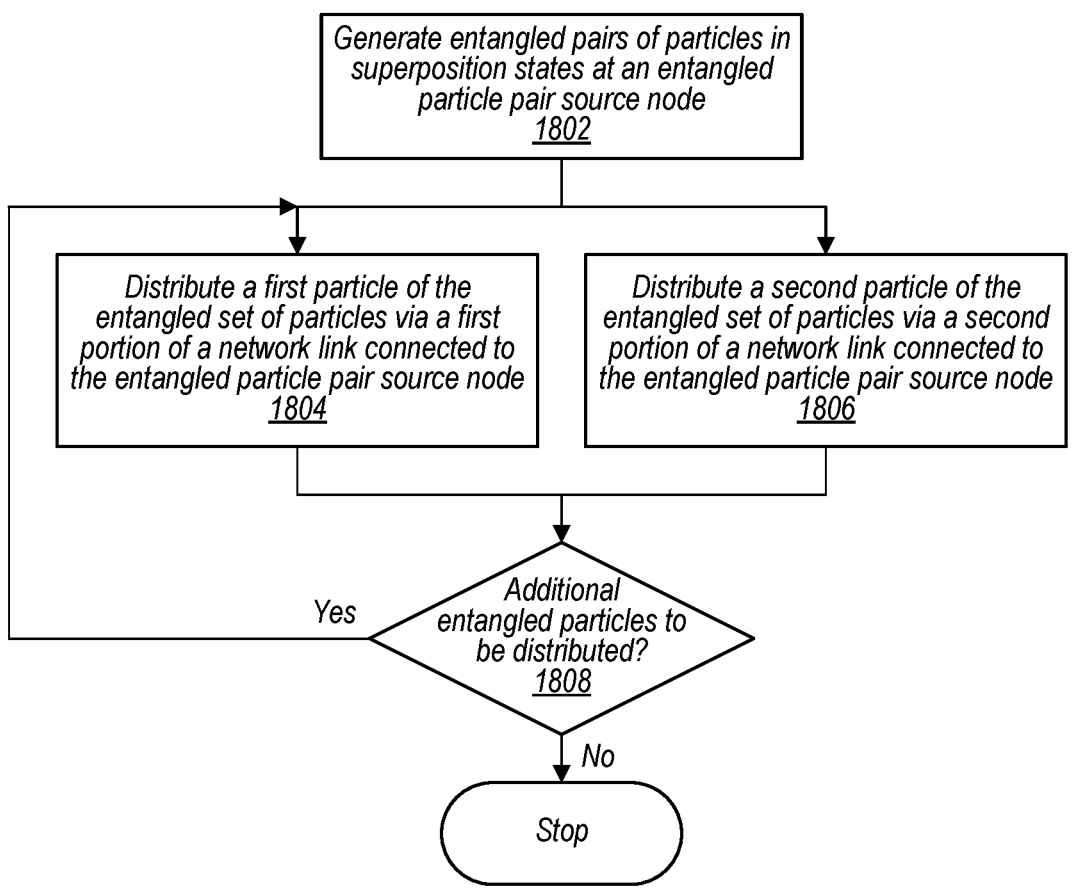
FIG. 18 is an example flow diagram for providing entangled particle/particle pairs via an entangled particle source node of a quantum entanglement distribution service, according to some embodiments.

FIG. 18 is an example flow diagram for providing entangled particle/particle pairs via an entangled particle source node of a quantum entanglement distribution service, according to some embodiments.

At block 1802, an entangled particle source node, such as entangled particle source nodes 314, 316, or 318 shown in FIG. 3, generate entangled pairs of particles in superposition states. At block 1804, the entangled particle source node distributes a first particle of the entangled set of particles via a first portion of a network link connected to the entangled particle pair source node and at block 1806 distributes a second particle of the entangled set of particles via a second portion of a network link connected to the entangled particle pair source node. At block 1808, the entangled particle source node determines whether additional entangled particles are to be distributed. If so, the process is repeated, if not the process is stopped. In some embodiments, an entangled particle source node may repeatedly generate and distribute entangled particles while quantum entanglement is being distributed. This may be done such that if some of the entangled particles fail to reach a recipient node other distributed particles are successively distributed to increase a probability that the distributed particles reach the intended recipient node.

Figure 19:
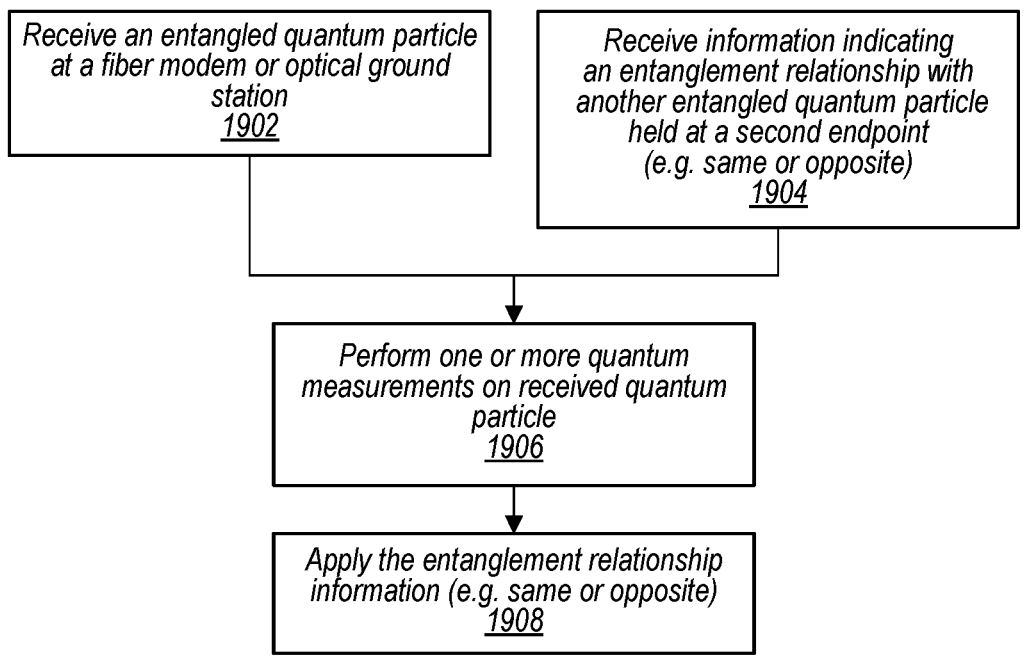
FIG. 19 is an example flow diagram for extending quantum entanglement distribution to a recipient endpoint, according to some embodiments.

FIG. 19 is an example flow diagram for extending quantum entanglement distribution to a recipient endpoint, according to some embodiments.

At block 1902, an endpoint (such as a customer endpoint or a service provider endpoint, such as quantum device 120) receives an entangled quantum particle. If the particle is received at a fiber modem, the particle is measured upon receipt. Otherwise, the received quantum particle may be stored in a quantum memory at the receiving endpoint. Also, at block 1904, the endpoint receives information indicating an entanglement relationship with another entangled quantum particle held at a second endpoint (e.g., same or opposite). At block 1906, the endpoint performs one or more quantum measurements on the received quantum particle and at block 1908 applies the entanglement relationship information to deduce a corresponding measurement outcome observed at the second endpoint. As discussed above, such a technique may be used to communicate information in a quantum secure manner that is protected from third party interference or eavesdropping even if communicated using networking equipment in a trustless zone outside of the control of the quantum entanglement service and/or a service provider network associated with the quantum entanglement service.

Figure 20:
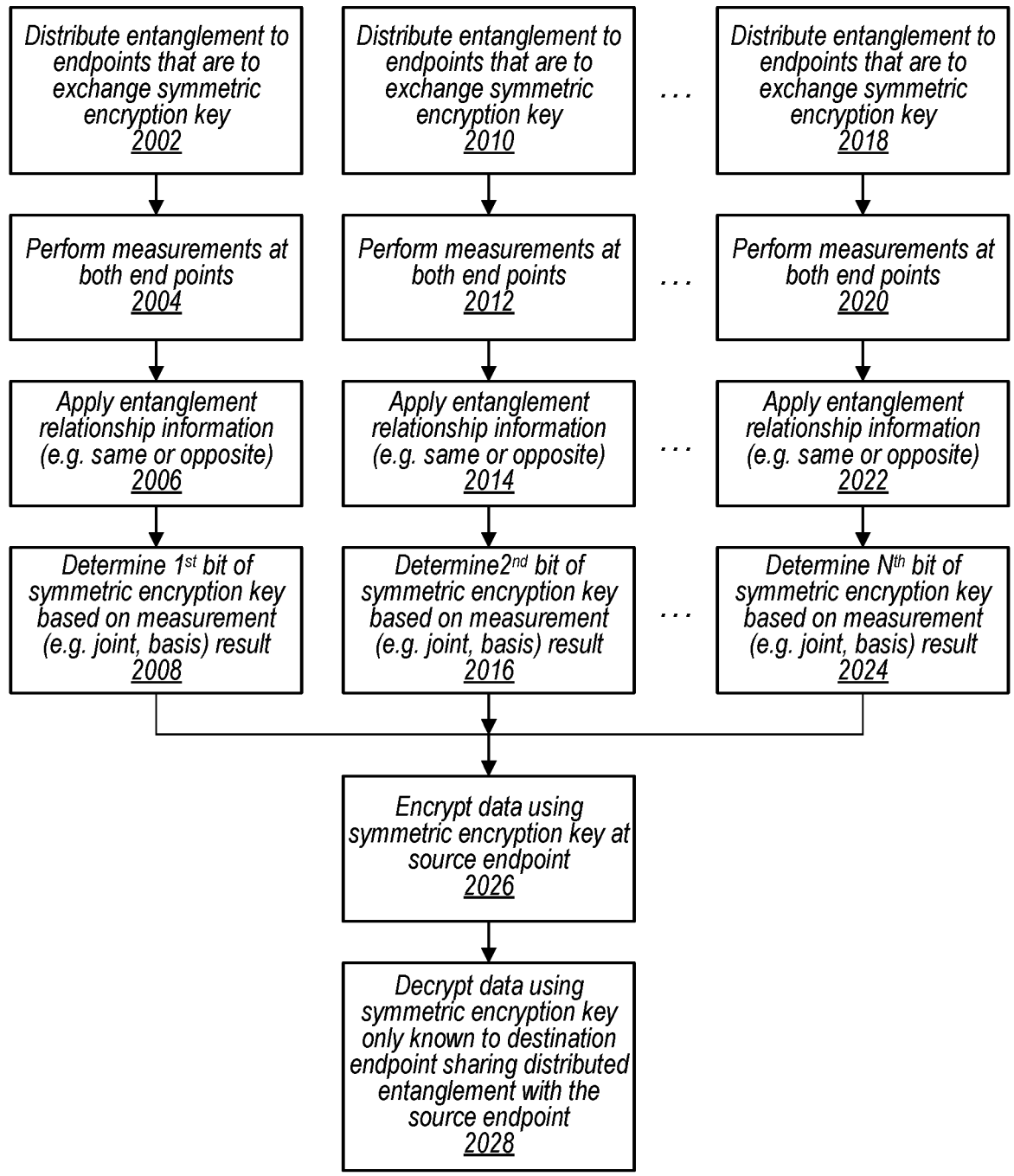
FIG. 20 is an example flow diagram for a process of distributing a symmetric encryption key using distributed quantum entanglement, according to some embodiments.

FIG. 20 is an example flow diagrams for a process of distributing a symmetric encryption key using distributed quantum entanglement, according to some embodiments.

At block 2002, entanglement is distributed between endpoints that are to communicate a symmetric encryption key. At block 2004, measurements are performed at both ends of the distributed quantum entanglement. At block 2006, the entanglement relationship information determined for the distributed entanglement is applied at one or both endpoints. Then at block 2008 a first bit of the symmetric encryption key is determined for both parties at both ends of the distributed entanglement based on the measurement result to which the entanglement relationship has been applied. This process may be repeated at blocks 2010 through 2016 to determine a second bit of the symmetric encryption key and may further be repeated any number of times, such as at blocks 2018 through 2024 to determine N bits of the symmetric encryption key.

At block 2026, data is encrypted by one of the parties using the bits of the determined symmetric encryption key and at block 2028 the data is decrypted by a second one of the parties using the bits of the determined symmetric encryption key. Because the bits of the symmetric encryption key are based on the measurements of the distributed entanglement, the bits are only known by the parties sharing the distributed entanglement. Also, if the symmetric encryption key is only used once by the respective parties, it is nearly impossible to be defeated, if sufficiently random.

Figure 21:
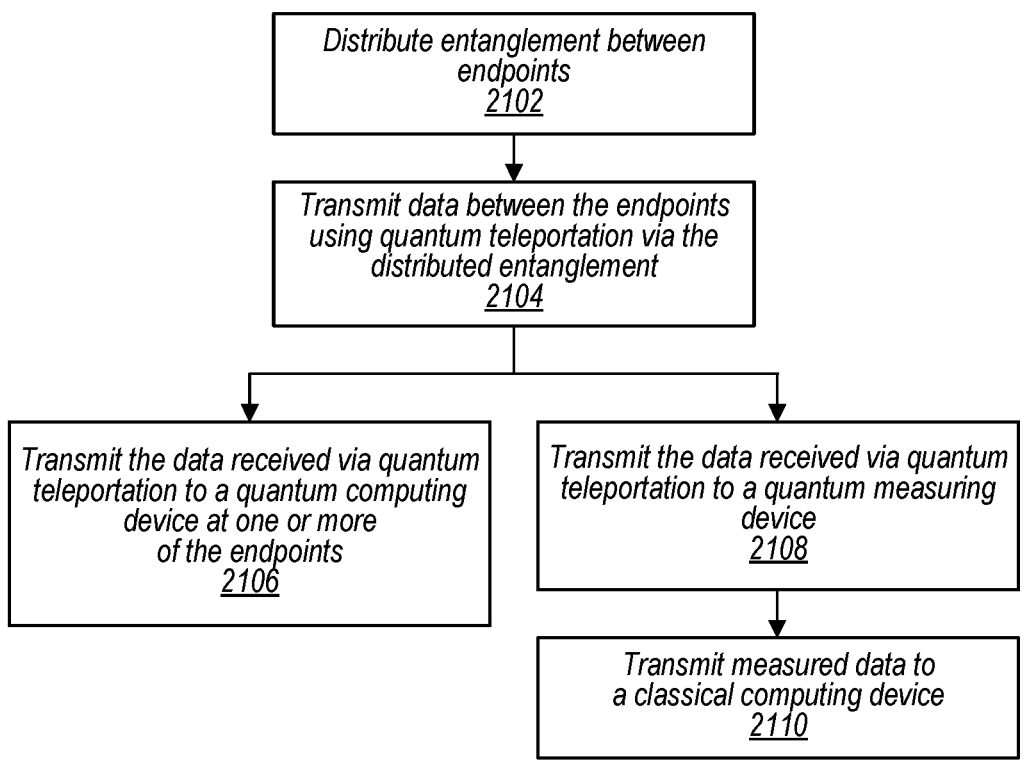
FIG. 21 is an example flow diagram for a process of communicating data between a customer endpoint and a resource (e.g., classical or quantum) of a service provider network using distributed quantum entanglement, according to some embodiments.

FIG. 21 is an example flow diagram for a process of communicating data between a customer endpoint and a resource (e.g., classical or quantum) of a service provider network using distributed quantum entanglement, according to some embodiments.

At block 2102 quantum entanglement is distributed between endpoints, such as endpoints of a customer, endpoints of different customers, or an endpoint of a customer and an endpoint of a service provider network. At block 2104 data is communicated between the endpoints using quantum teleportation via the distributed entanglement. In some circumstances, at block 2106, the data communicated via quantum teleportation is transmitted to a quantum computing device at one of the endpoints. In other circumstances, at block 2108, the data communicated via quantum teleportation is transmitted to a quantum measuring device and at block 2110 measured data, measured at the quantum measuring device, is transmitted to a classical computing device. This process may be repeated to send and receive information between endpoints connected via distributed quantum entanglement.

Illustrative Computer System

Figure 22:
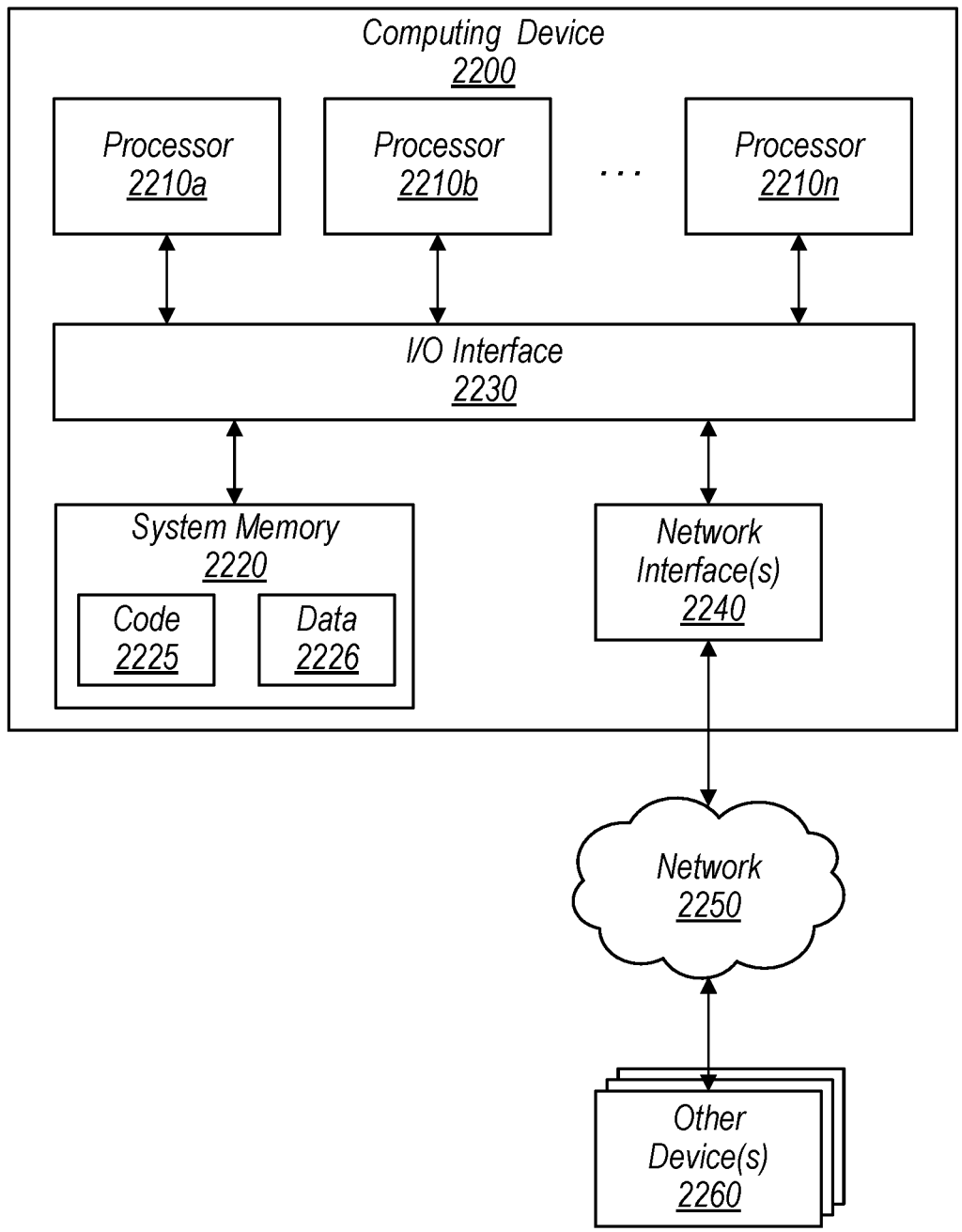
FIG. 22 is a block diagram illustrating an example computing device that may be used in at least some embodiments.

FIG. 22 illustrates such a general-purpose computing device 2200 as may be used in any of the embodiments described herein. In the illustrated embodiment, computing device 2200 includes one or more processors 2210 coupled to a system memory 2220 (which may comprise both non-volatile and volatile memory modules) via an input/output (I/O) interface 2230. Computing device 2200 further includes a network interface 2240 coupled to I/O interface 2230.

In various embodiments, computing device 2200 may be a uniprocessor system including one processor 2210, or a multiprocessor system including several processors 2210 (e.g., two, four, eight, or another suitable number). Processors 2210 may be any suitable processors capable of executing instructions. For example, in various embodiments, processors 2210 may be general-purpose or embedded processors implementing any of a variety of instruction set architectures (ISAs), such as the x86, PowerPC, SPARC, or MIPS ISAs, or any other suitable ISA. In multiprocessor systems, each of processors 2210 may commonly, but not necessarily, implement the same ISA. In some implementations, graphics processing units (GPUs) may be used instead of, or in addition to, conventional processors.

System memory 2220 may be configured to store instructions and data accessible by processor(s) 2210. In at least some embodiments, the system memory 2220 may comprise both volatile and non-volatile portions; in other embodiments, only volatile memory may be used. In various embodiments, the volatile portion of system memory 2220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 2220 as code 2225 and data 2226.

In some embodiments, I/O interface 2230 may be configured to coordinate I/O traffic between processor 2210, system memory 2220, and any peripheral devices in the device, including network interface 2240 or other peripheral interfaces such as various types of persistent and/or volatile storage devices. In some embodiments, I/O interface 2230 may perform any necessary protocol, timing or other data transformations to convert data signals from one component (e.g., system memory 2220) into a format suitable for use by another component (e.g., processor 2210). In some embodiments, I/O interface 2230 may include support for devices attached through various types of peripheral buses, such as a variant of the Peripheral Component Interconnect (PCI) bus standard or the Universal Serial Bus (USB) standard, for example. In some embodiments, the function of I/O interface 2230 may be split into two or more separate components, such as a north bridge and a south bridge, for example.

Also, in some embodiments some or all of the functionality of I/O interface 2230, such as an interface to system memory 2220, may be incorporated directly into processor 2210.

Network interface 2240 may be configured to allow data to be exchanged between computing device 2200 and other devices 2260 attached to a network or networks 2250, such as other computer systems or devices as illustrated in FIG. 1 through FIG. 21, for example. In various embodiments, network interface 2240 may support communication via any suitable wired or wireless general data networks, such as types of Ethernet network, for example. Additionally, network interface 2240 may support communication via telecommunications/telephony networks such as analog voice networks or digital fiber communications networks, via storage area networks such as Fibre Channel SANs, or via any other suitable type of network and/or protocol.

In some embodiments, system memory 2220 may represent one embodiment of a computer-accessible medium configured to store at least a subset of program instructions and data used for implementing the methods and apparatus discussed in the context of FIG. 1 through FIG. 21. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 2200 via I/O interface 2230. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 2200 as system memory 2220 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 2240. Portions or all of multiple computing devices such as that illustrated in FIG. 22 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
   a quantum device included in a service provider network, the quantum device configured to receive or generate photons in a superposition state;
   a network interface configured to connect the quantum device of the service provider network, via one or more of a plurality of network links, to one or more of a plurality of intermediate nodes;
   the plurality of intermediate nodes, wherein:
      respective ones of the intermediate nodes are configured to generate a photon in a superposition state or receive a photon in a superposition state; and
      the plurality of intermediate nodes comprises a quantum repeater, wherein the quantum repeater comprises quantum memories, and is configured to:
         issue, via a quantum non-destruction measuring device of the quantum repeater, a first heralding signal that announces a reception of a first photon in a superposition state to a first one of the quantum memories that enables a first qubit;
         issue, via the quantum non-destruction measuring device, a second heralding signal that announces a reception of a second photon in a superposition state to a second one of the quantum memories that enables a second qubit; and
         responsive to the issuance of the second heralding signal, cause joint measurements to be performed to extend quantum entanglement, wherein:
            the joint measurements determine a correlation relationship between the first and second photons via a measurement of how the first photon changed when combined with the first qubit and how the second photon changed when combined with the second qubit; and
            the joint measurements are performed without collapsing the superposition states of the first and second photons or the first and second qubits; and
   one or more computing devices of the service provider network configured to implement a quantum entanglement distribution service configured to:
      receive, from a customer, a request for distribution of quantum entanglement to an endpoint of the customer;
      determine a path comprising one or more of the plurality of network links and one or more of the plurality of intermediate nodes, wherein the determined one or more network links and the determined one or more intermediate nodes form a network path between the quantum device of the service provider network and the endpoint of the customer; and
      cause quantum entanglement to be distributed from the quantum device of the service provider network to the endpoint of the customer, via the network interface and the determined one or more network links and the determined one or more intermediate nodes.

2. The system of claim 1, wherein the quantum entanglement distribution service is further configured to:
   receive, from the customer, a request for distribution of quantum entanglement between specified endpoints of the customer or of a third party;
   determine another path comprising one or more of the plurality of network links and one or more of the plurality of intermediate nodes, wherein the determined one or more network links and the determined one or more intermediate nodes of the other path form a network path between the specified endpoints of the customer or of the third party; and
   cause quantum entanglement to be distributed between the specified endpoints of the customer or of the third party, via the determined one or more network links and the determined one or more intermediate nodes of the other path.

3. The system of claim 1, wherein the service provider network comprises two or more data centers, and wherein the determined one or more network links and the determined one or more intermediate nodes of the other path that forms the network path between the specified endpoints of the customer or of the third party comprise:
   one or more network links between a first one of the specified endpoints and a first data center of the service provider network;
   one or more network links between the first data center of the service provider network and a second data center of the service provider network; and
   one or more network links between the second data center of the service provider network and a second one of the specified endpoints.

4. The system of claim 1, wherein:
   one or more of the plurality of intermediate nodes are located in a trusted location under control of the service provider network;
   one or more other ones of the plurality of intermediate nodes are located in a non-trusted location outside of the control of the service provider network; and
   the distributed quantum entanglement provides a security or privacy guarantee that information conveyed via the quantum entanglement is not being monitored or altered at the non-trusted location.

5. The system of claim 1, wherein the plurality of intermediate nodes comprise:
   repeater nodes; and
   entangled photon pair source nodes,
   wherein the entangled photon pair source nodes are configured to:
      provide sets of entangled photons in superposition states to respective ones of the repeater nodes connected to a given photon pair source node via respective ones of the plurality of network links.

6. A method of distributing quantum entanglement to customers of a quantum entanglement distribution service, the method comprising:
   receiving, from a customer, a request for distribution of quantum entanglement between a set of endpoints;
   determining a path comprising a plurality of network links and a plurality of intermediate nodes between the set of endpoints, wherein the plurality of intermediate nodes comprises a quantum repeater; and causing quantum entanglement to be distributed between the set of endpoints via the determined plurality of network links and the determined plurality of intermediate nodes, wherein the causing the quantum entanglement to be distributed comprises:
at the quantum repeater,
issuing, via a quantum non-destruction measuring device of the quantum repeater, a first heralding signal that announces a reception of a first photon in a superposition state to a first quantum memory of the quantum repeater that enables a first qubit;
issuing, via the quantum non-destruction measuring device, a second heralding signal that announces a reception of a second photon in a superposition state to a second quantum memory of the quantum repeater that enables a second qubit; and
responsive to the issuance of the second heralding signal, causing joint measurements to be performed to extend the quantum entanglement along the path, wherein:
the joint measurements determine a correlation relationship between the first and second photons via a measurement of how the first photon changed when combined with the first qubit and how the second photon changed when combined with the second qubit; and the joint measurements are performed without collapsing the superposition states of the first and second photons or the first and second qubits.

7. The method of claim 6, wherein the plurality of intermediate nodes comprises:
quantum repeaters, each connected to a set of the determined network links and a plurality of other network links, wherein respective ones of the quantum repeaters are configured to form network paths to a plurality of endpoints via respective ones of the network links connected to the respective quantum repeater.

8. The method of claim 7, wherein the plurality of intermediate nodes further comprise:
entangled particle source nodes configured to:
provide sets of entangled particles in superposition states to respective ones of the repeater nodes connected to a given entangled particle pair source node via respective ones of the plurality of network links.

9. The method of claim 6, wherein the plurality of intermediate nodes comprise:
one or more intermediate nodes located in a trusted location under control of a service provider network that includes the quantum entanglement distribution service;
one or more intermediate nodes located in a non-trusted location outside of the control of the service provider network; and
wherein the distributed quantum entanglement provides a security or privacy guarantee that information conveyed via the quantum entanglement is not being monitored or altered at the non-trusted location.

10. The method of claim 6, wherein the set of endpoints to which quantum entanglement is distributed comprise: an endpoint within a service provider network, wherein the entanglement service is included in the service provider network; and
a customer endpoint external to the service provider network.

11. The method of claim 10, further comprising:
providing a quantum secure connection between the customer endpoint external to the service provider network and a resource of the service provider network via the distributed quantum entanglement.

12. The method of claim 11, further comprising:
transmitting data between the customer endpoint and the resource of the service provider network via the quantum secure connection,
wherein the data is transmitted to:
a classical computing resource of the service provider network; or
a quantum computing resource of the service provider network or a quantum hardware provider associated with the service provider network.

13. The method of claim 6, further comprising:
distributing a symmetric encryption key between the set of endpoints via the distributed entanglement, wherein measurements of respective superposition states of respective photons of the distributed entanglement are measured at the endpoints to distribute bits of the symmetric encryption key.

14. The method of claim 6, wherein said causing quantum entanglement to be distributed between the set of endpoints via the determined plurality of network links and the determined plurality of intermediate nodes further comprises:
storing the first photon in a superposition state received at a repeater node via a first network link of the path; and
storing the second photon in a superposition state received at the repeater node via a second network link of the path.

15. The method of claim 14, wherein said causing quantum entanglement to be distributed between the set of endpoints via the determined plurality of network links and the determined plurality of intermediate nodes, further comprises:
providing, from a first entangled particle pair source node located between an end and another end of the first network link, the first entangled particle to the repeater node and also providing a third entangled particle to another repeater node at the other end of the first network link, wherein the first entangled particle and the third entangled particle are particles of a first pair of entangled particles provided by the first entangled particle pair source node; and
providing, from a second entangled particle pair source node located between an end and another end of the second network link, the second particle to the repeater node and also providing a fourth entangled particle to an additional repeater node at the other end of the second network link, wherein the second entangled particle and the fourth entangled particle are particles of a second pair of entangled particles provided by the second entangled particle pair source node.

16. One or more non-transitory, computer-readable, storage media storing program instructions, that when executed on or across one or more processors, cause the one or more processors to:
receive, from a customer, a request for distribution of quantum entanglement between a set of endpoints;
determine a path comprising a plurality of network links and a plurality of intermediate nodes between the set of endpoints, wherein the plurality of intermediate nodes comprises a quantum repeater; and
cause quantum entanglement to be distributed between the set of endpoints via the determined plurality of network links and the determined plurality of intermediate nodes, wherein, to cause the quantum entanglement to be distributed, the program instructions further cause the one or more processors to:

at the quantum repeater,
- receive, from a quantum non-destruction measuring device of the quantum repeater, a first heralding signal that announces reception of a first photon in a superposition state to a first quantum memory of the quantum repeater that enables a first qubit;
- receive, from the quantum non-destruction measuring device, a second heralding signal that announces reception of a second photon in a superposition state to a second quantum memory of the quantum repeater that enables a second qubit; and
- responsive to the reception of the second heralding signal, cause joint measurements to be performed to extend the quantum entanglement along the path, wherein:
  - the joint measurements determine a correlation relationship between the first and second photons via a measurement of how the first photon changed when combined with the first qubit and how the second photon changed when combined with the second qubit; and
  - the joint measurements are performed without collapsing the superposition states of the first and second photons or the first and second qubits.

17. The one or more non-transitory, computer-readable storage media of claim 16, wherein:
   the set of endpoints comprise an endpoint at a customer location outside of a service provider network and an endpoint at the service provider network, and
   wherein the program instructions, when executed on or across the one or more processors, further cause the one or more processors to:
   transmit data via a quantum secure connection formed via the distributed entanglement between the customer endpoint and the endpoint of the service provider network.

18. The one or more non-transitory, computer-readable storage media of claim 16, wherein:
   the set of endpoints comprise an endpoint at a customer location outside of a service provider network and another endpoint at another customer location or a third-party location outside of the service provider network, and
   wherein the program instructions, when executed on or across the one or more processors, further cause the one or more processors to:
   transmit data via a quantum secure connection formed via the distributed entanglement between the customer endpoint and the other endpoint of the customer or third-party.

19. The one or more non-transitory, computer readable storage media of claim 16, wherein:
   respective ones of the intermediate nodes are each connected to an additional plurality of network links, and
   to determine the path the program instructions, when executed on or across the one or more processors, cause the one or more processors to:
   select respective sets of network links from a larger group of a network links connected to respective ones of the intermediate nodes, wherein the selected set of network links forms a portion of the path between the set of endpoints; and
   to form different paths between different endpoints, the program instructions, when executed on or across the one or more processors, cause the one or more processors to:
   select different combinations of network links from the larger group of network links connected to a given intermediate node to form the different respective paths between the different respective endpoints.

\* \* \* \* \*